(12) United States Patent
Kung et al.

(10) Patent No.: US 10,811,196 B2
(45) Date of Patent: Oct. 20, 2020

(54) DEFORMABLE ELECTRODES AND DEVICES FOR CONVERTING MECHANICAL ENERGY TO ELECTRICAL ENERGY

(71) Applicant: Northwestern University, Evanston, IL (US)

(72) Inventors: Harold H. Kung, Wilmette, IL (US); Xuejun Bai, Shanghai (CN); Yue Y. Yu, Evanston, IL (US); Mayfair C. Kung, Wilmette, IL (US)

(73) Assignee: Northwestern University, Evanston, IL (US)

( * ) Notice: Subject to any disclaimer, the term of this patent is extended or adjusted under 35 U.S.C. 154(b) by 27 days.

(21) Appl. No.: 16/212,085

(22) Filed: Dec. 6, 2018

(65) Prior Publication Data

US 2019/0237268 A1 Aug. 1, 2019

Related U.S. Application Data

(63) Continuation-in-part of application No. PCT/US2017/036310, filed on Jun. 7, 2017.
(Continued)

(51) Int. Cl.
*H01G 11/26* (2013.01)
*H01G 11/32* (2013.01)
(Continued)

(52) U.S. Cl.
CPC .............. *H01G 11/26* (2013.01); *H01G 5/011* (2013.01); *H01G 5/0132* (2013.01);
(Continued)

(58) Field of Classification Search
CPC ...... H01G 11/26; H01G 5/011; H01G 5/0132; H01G 11/04; H01G 11/14; H01G 11/32;
(Continued)

(56) References Cited

U.S. PATENT DOCUMENTS 8,274,781 B2 9/2012 Venkateswaran
9,206,523 B2 12/2015 Gardner et al.
(Continued)

FOREIGN PATENT DOCUMENTS

WO WO 2017/048341 A1 3/2017
WO WO 2017/214246 A1 12/2017

OTHER PUBLICATIONS

Yu et al., "Electromechanical properties of reduced graphene oxide thin film on 3D elastomeric substrate," Carbon, vol. 115, 2017, pp. 380-387.
(Continued)

*Primary Examiner* — Michael P McFadden
(74) *Attorney, Agent, or Firm* — Bell & Manning, LLC

(57) ABSTRACT

Deformable electrodes, deformable supercapacitors comprising the deformable electrodes, and electric circuits comprising the supercapacitors are provided. Methods of using the supercapacitors to convert mechanical energy to electrical energy are also provided. The supercapacitors include a liquid electrolyte disposed between two electrodes, at least one of which is reversibly deformable when it is compressed. The liquid electrolyte is infused into the deformable electrode and the supercapacitors are characterized in that the deformation of the deformable electrodes causes the interfacial area between the electrolyte and the deformable electrode to decrease when the electrode is deformed.

20 Claims, 24 Drawing Sheets

Related U.S. Application Data

(60) Provisional application No. 62/346,967, filed on Jun. 7, 2016.

(51) Int. Cl.

| | | |
|---|---|---|
| *H01G 11/36* | (2013.01) | |
| *H01G 11/04* | (2013.01) | |
| *H01G 11/38* | (2013.01) | |
| *H01G 5/013* | (2006.01) | |
| *H01G 11/14* | (2013.01) | |
| *H01G 5/011* | (2006.01) | |
| *H01G 11/46* | (2013.01) | |
| *H01G 11/58* | (2013.01) | |

(52) U.S. Cl.
CPC .............. *H01G 11/04* (2013.01); *H01G 11/14* (2013.01); *H01G 11/32* (2013.01); *H01G 11/36* (2013.01); *H01G 11/38* (2013.01); *H01G 11/46* (2013.01); *H01G 11/58* (2013.01); *Y02E 60/13* (2013.01)

(58) Field of Classification Search
CPC ........ H01G 11/36; H01G 11/38; H01G 11/46; H01G 11/58; Y02E 60/13
See application file for complete search history.

(56) References Cited

U.S. PATENT DOCUMENTS

| | | | |
|---|---|---|---|
| 9,437,372 B1 | 9/2016 | Zhamu et al. | |
| 2008/0297972 A1 | 12/2008 | Matz | |
| 2009/0059474 A1 | 3/2009 | Zhamu et al. | |
| 2012/0320492 A1* | 12/2012 | Radivojevic | H01M 10/058 361/291 |
| 2016/0043384 A1* | 2/2016 | Zhamu | H01M 4/587 429/231.4 |
| 2016/0054593 A1* | 2/2016 | Flitsch | G02C 11/10 351/158 |
| 2016/0079001 A1* | 3/2016 | Lin | C04B 35/4682 361/305 |
| 2017/0062143 A1 | 3/2017 | Zhamu et al. | |

OTHER PUBLICATIONS

Gupta et al., "Superior nano-mechanical properties of reduced graphene oxide reinforced polyurethane composites," RSC Advances, Jan. 2015, DOI: 10.1039/C4RA14223C, pp. 1-23.

Chen et al., "Achieving High Performance Electric Field Induced Strain: A Rational Design of Hyperbranched Aromatic Polyamide Functionalized Graphene—Polyurethane Dielectric Elastomer Composites," J. Phys. Chem. B, vol. 119, Mar. 2015, pp. 4521-4530.

Krol et al., "Composites prepared from the waterborne polyurethane cationomers-modified graphene. Part II. Electrical properties of the polyurethane films," Colloid Polym. Sci., vol. 293, Jul. 2015, pp. 2941-2947.

Zhang et al., "In-situ synthesis of carbon nanotube/graphene composite sponge and its application as compressible supercapacitor electrode," Electrochimica Acta, vol. 157, 2015, pp. 134-141.

Wang et al. "A Responsive Battery with Controlled Energy Release," Angew. Chem. Int. Ed., vol. 55, 2016, pp. 14643-14647.

Dimiev et al., "Low-Loss, High-Permittivity Composites Made from Graphene Nanoribbons," ACS Appl. Mater. Interfaces, vol. 3, 2011, pp. 4657-4661.

Yao et al., "A Flexible and Highly Pressure-Sensitive Graphene—Polyurethane Sponge Based on Fractured Microstructure Design," Adv. Mater., vol. 25, 2013, pp. 6692-6698.

Chen et al., "Ultra high permittivity and significantly enhanced electric field induced strain in PEDOT:PSS-RGO@PU intelligent shape-changing electro-active polymers," RSC Advances, vol. 4, 2014, pp. 64061-64067.

Gao et al., "Transparent, flexible, and solid-state supercapacitors based on graphene electrodes," APL Materials, vol. 1, 2013, pp. 012101-1-012101-7.

Hodlur et al., "Self assembled graphene layers on polyurethane foam as a highly pressure sensitive conducting composite," Composites Science and Technology, vol. 90, 2014, pp. 160-165.

Chen et al., "In situ synthesis of thermoplastic polyurethane/graphene nanoplatelets conductive composite by ball milling," Journal of Reinforced Plastics and Composites, vol. 32, No. 5, 2013, pp. 300-307.

Ding et al., "Electrical conductivity of waterborne polyurethane/graphene composites prepared by solution mixing," Journal of Composite Materials, vol. 46, No. 6, 2011, pp. 747-752.

Ke et al., "Graphene-based materials for supercapacitor electrodes e A review," J. Materiomics, vol. 2, 2016, pp. 37-54.

The International Search Report & Written Opinion issued in International patent application No. PCT/US2017/036310 dated Aug. 11, 2017, pp. 1-8.

Samad et al., "Graphene Foam Developed with a Novel Two-Step Technique for Low and High Strains and Pressure-Sensing Applications," Small, vol. 11, No. 20, 2015, pp. 2380-2385.

* cited by examiner

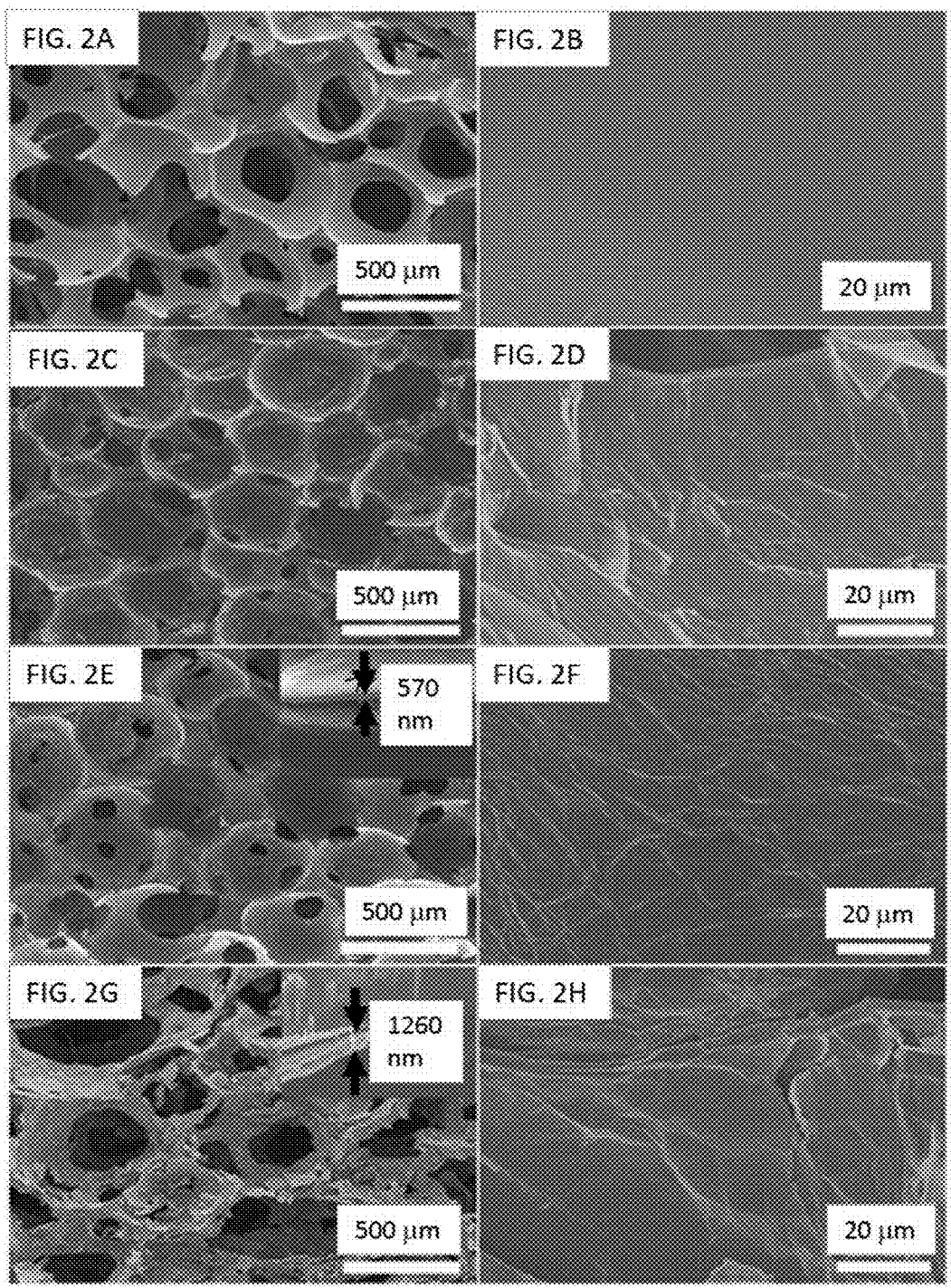

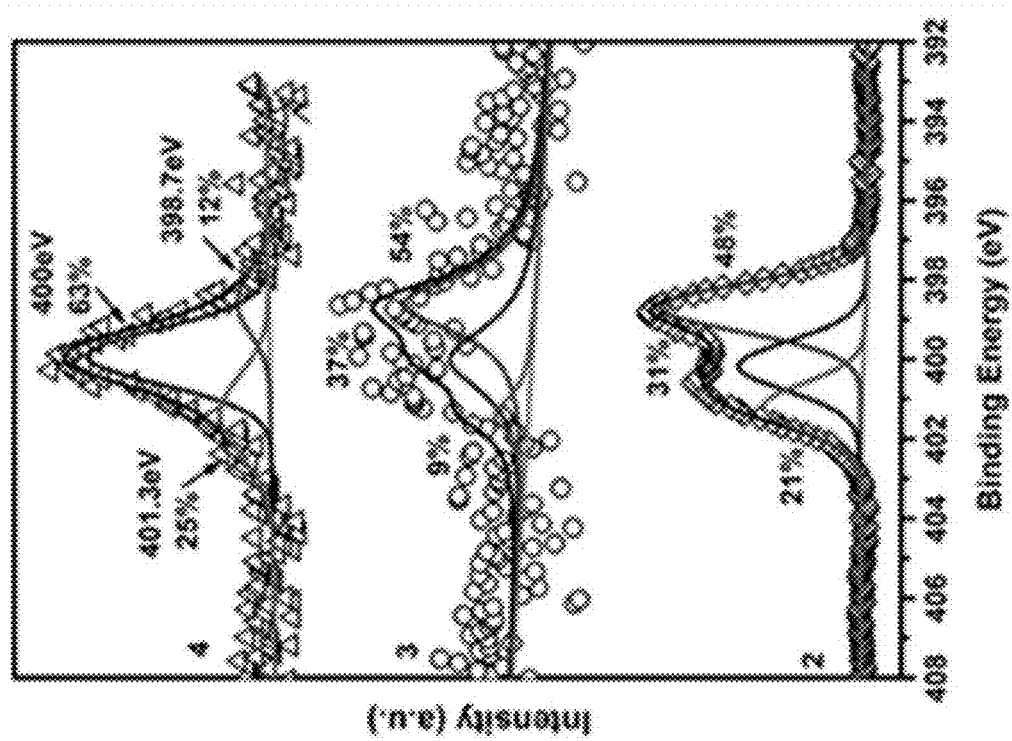
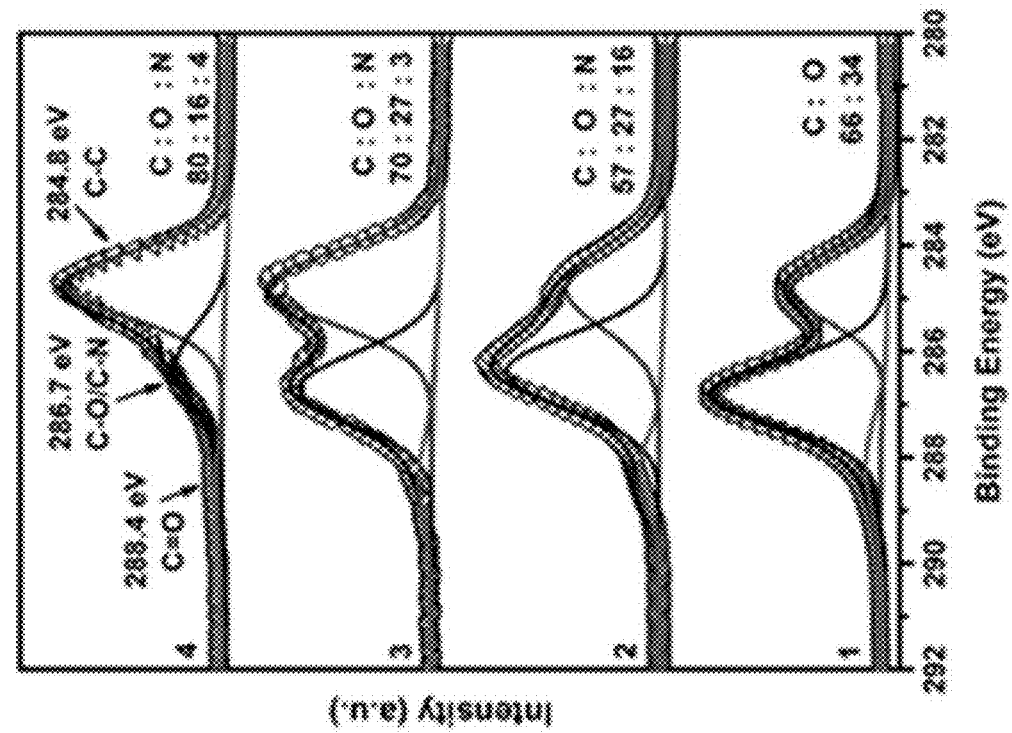
FIG. 3B
FIG. 3A

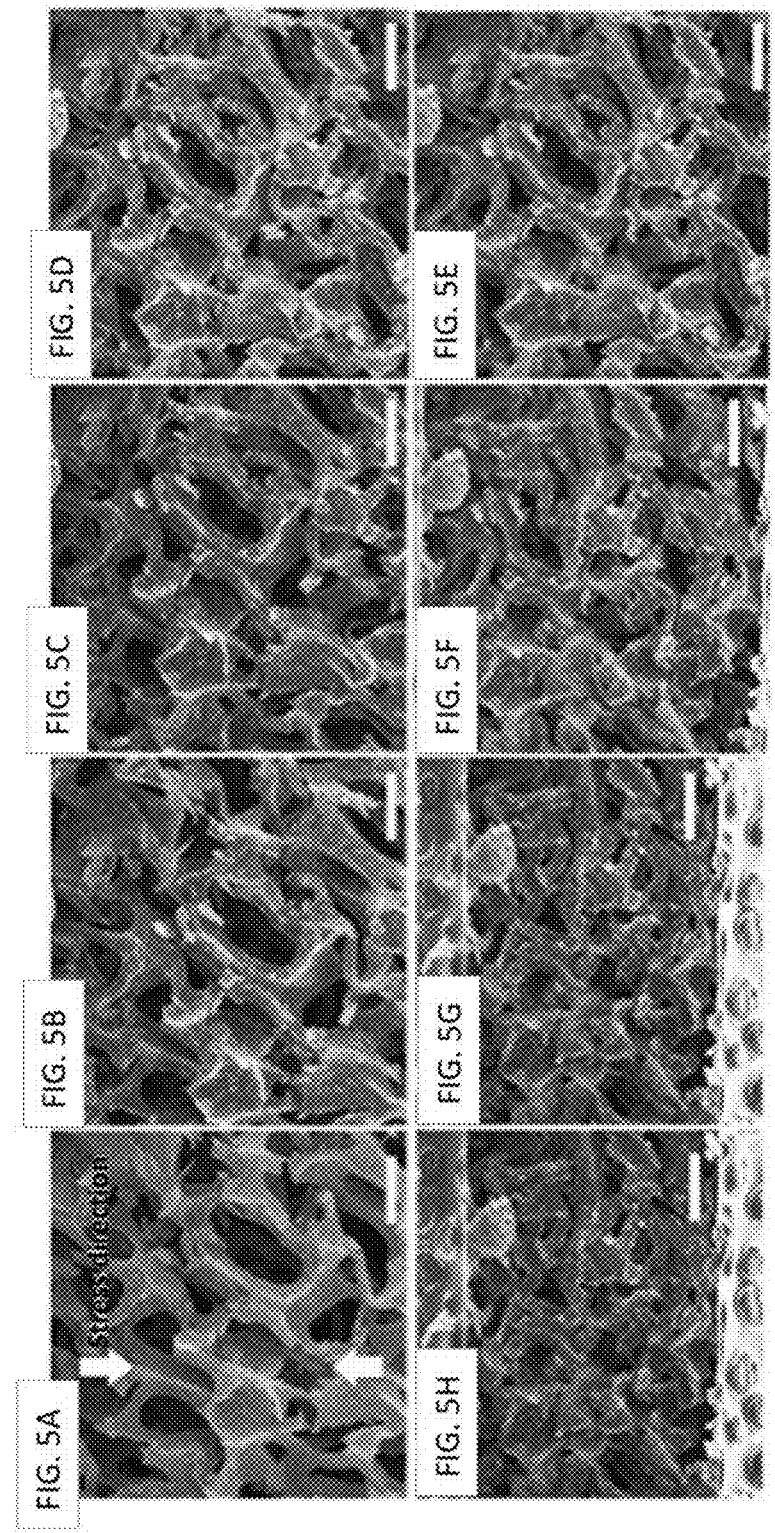

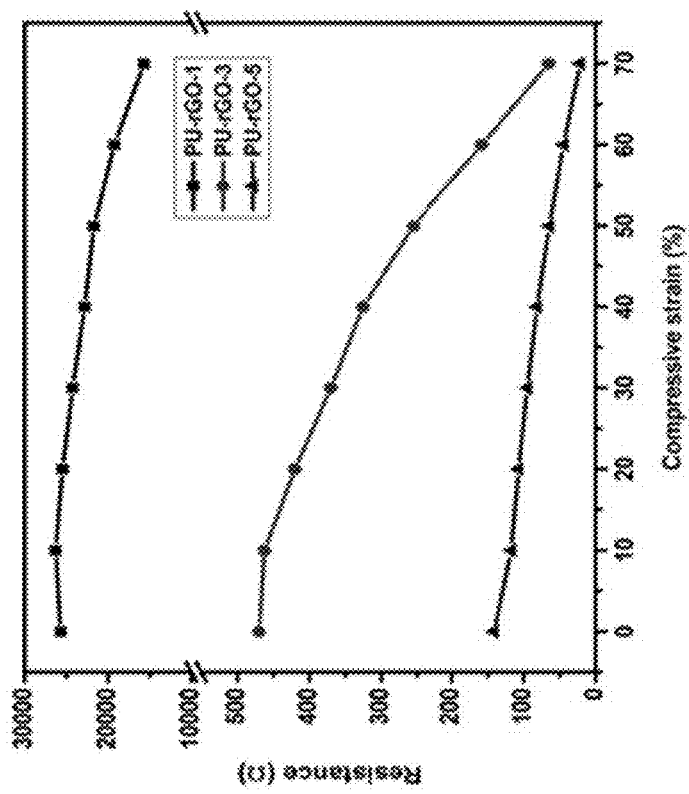
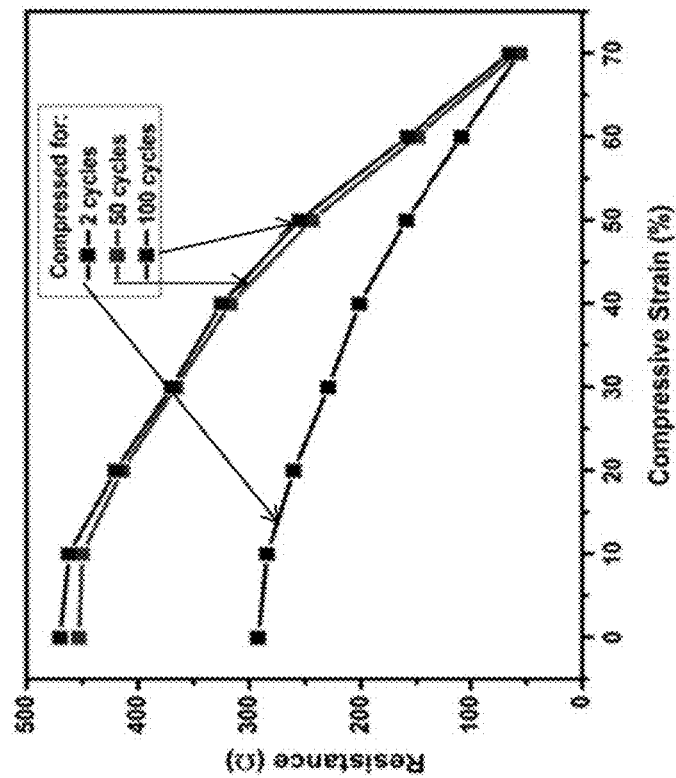
FIG. 6A
FIG. 6B

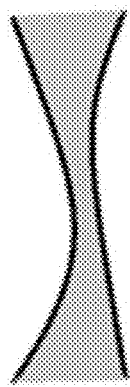 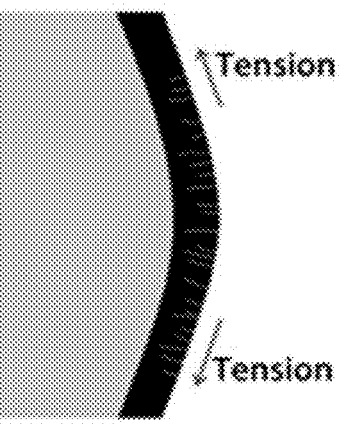 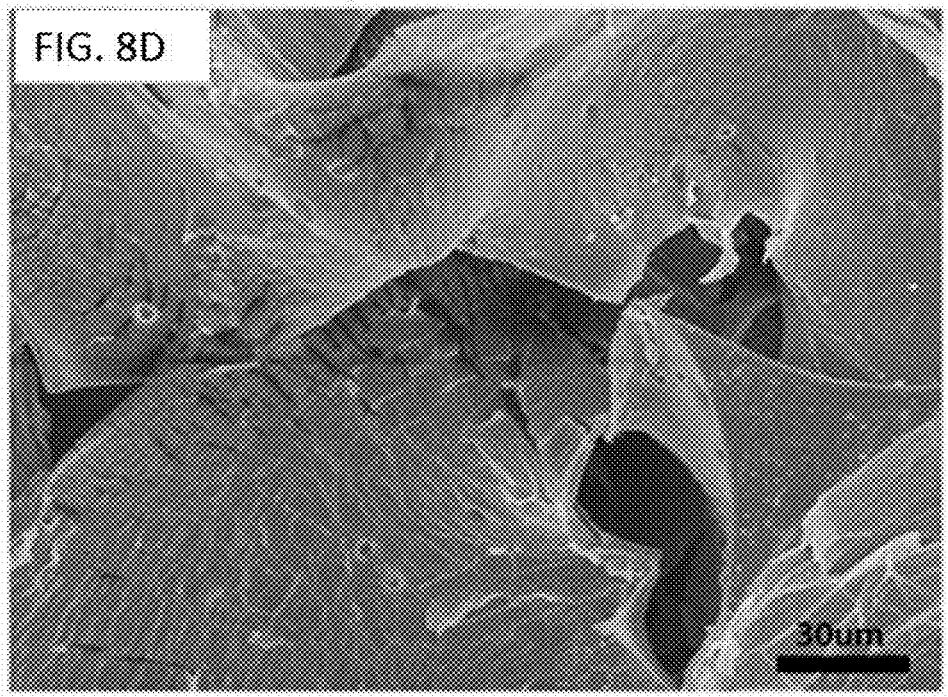
FIG. 8A  FIG. 8B  FIG. 8C  FIG. 8D

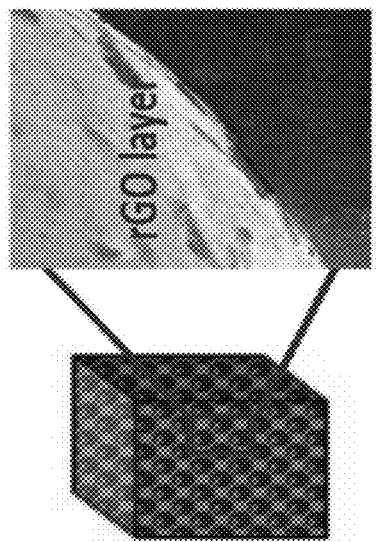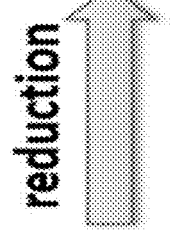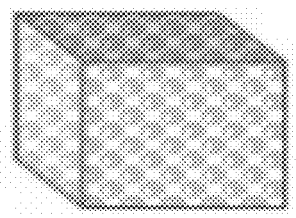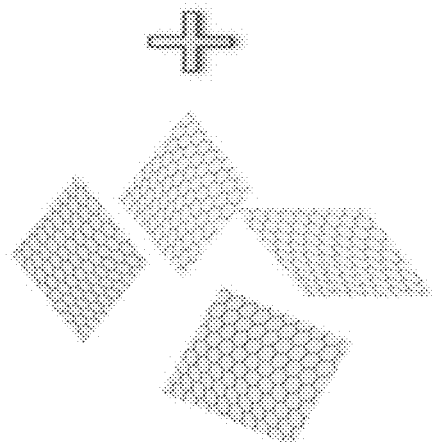
FIG. 9

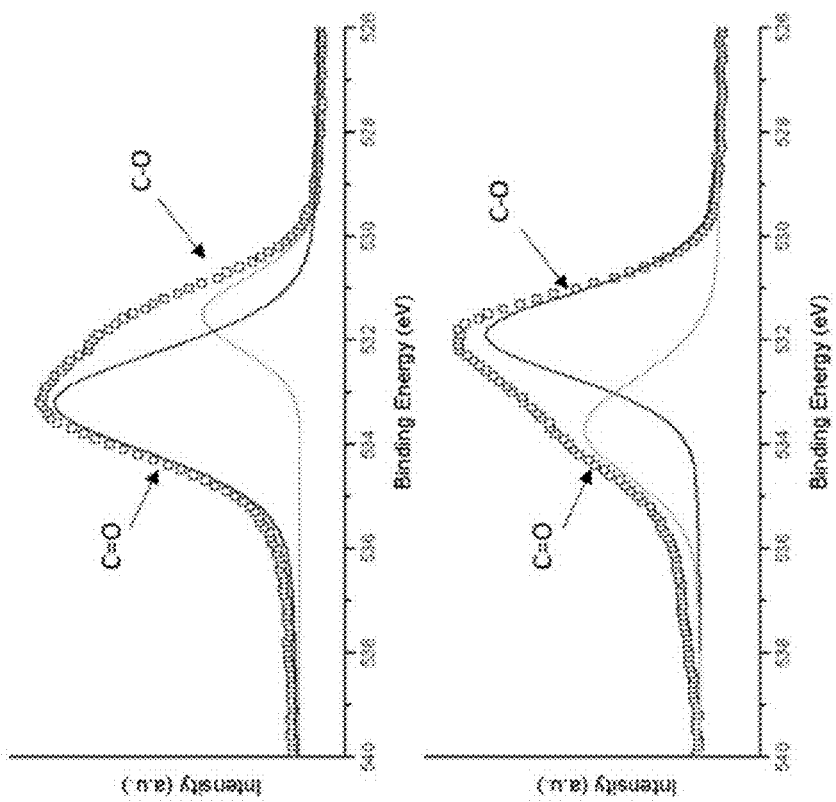
FIG. 17B
FIG. 17D
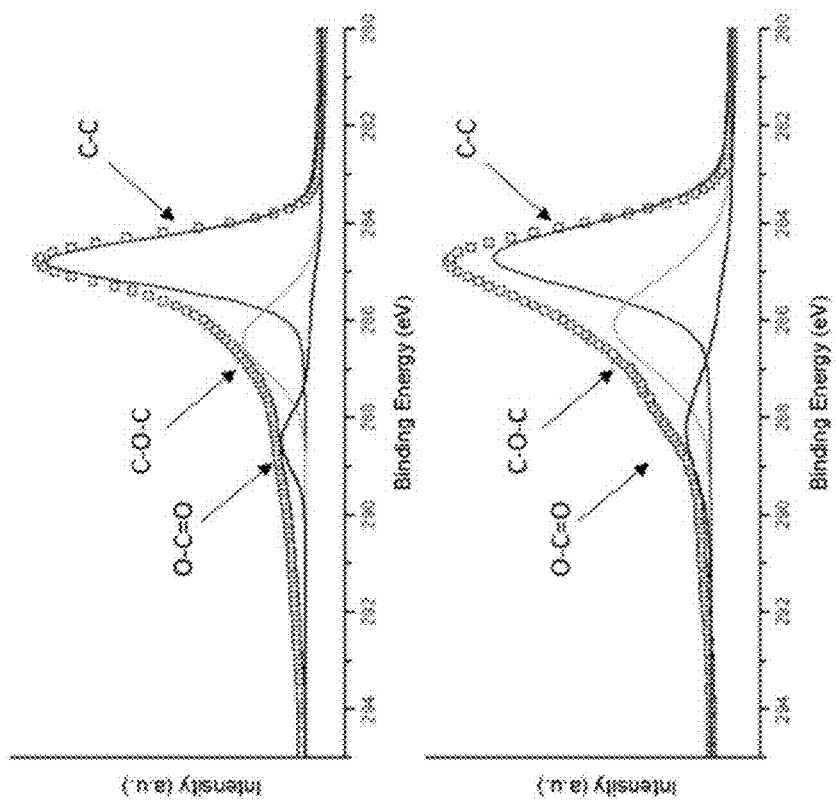
FIG. 17A
FIG. 17C

US 10,811,196 B2

DEFORMABLE ELECTRODES AND DEVICES FOR CONVERTING MECHANICAL ENERGY TO ELECTRICAL ENERGY

CROSS-REFERENCE TO RELATED APPLICATIONS

The present application is a continuation-in-part of International patent application number PCT/US2017/036310, which was filed on Jun. 7, 2017, the entire contents of which are hereby incorporated by reference, which claims priority from U.S. provisional patent application No. 62/346,967, which was filed on Jun. 7, 2016, the entire contents of which are hereby incorporated by reference.

BACKGROUND

Currently there is no satisfactory, easily scalable method to convert mechanical energy to electricity, especially random, small amplitude vibrations or compression. The common method of moving a magnet cross an electrical field as in a generator requires moving heavy magnets, which is not easily scalable or suitable for energy in compressive deformation. Piezoelectric materials are expensive, not easy to scale up, and have low conversion efficiencies. Thus, a low cost, readily scalable, efficient method is needed.

SUMMARY

Deformable electrodes, deformable supercapacitors comprising the deformable electrodes, and electrical circuits comprising the supercapacitors are provided. Methods of using the supercapacitors to convert mechanical energy to electrical energy are also provided.

The technology described in this disclosure relies on the concept of changing the storage capacity of an energy storage device by deformation. When deformation changes the electricity storage capacity of the device, electrical charges must move into or out of the device, thereby delivering electrical energy. Thus, the mechanical energy consumed in deforming the device is converted to electrical energy. If such a device is constructed using a conventional parallel plate capacitor, because of the very low capacitance, it could only deliver very small quantities of electricity, that is, the conversion efficiency is very low. The storage capacity of a supercapacitor (also known as ultracapacitor or double layer capacitor) is orders of magnitude ($10^4$-$10^8$) larger than a parallel plate capacitor. Thus, a device based on supercapacitors would be able to deliver high conversion efficiencies. The capacitance of a supercapacitor is proportional to the interfacial area between the electrode solid and the electrolyte. Thus, this invention utilizes a deformable supercapacitor electrode which changes its capacitance upon deformation by changing the interfacial area.

In one aspect, a supercapacitor is provided. In an embodiment, the supercapacitor comprises a first electrode; a second electrode, wherein at least one of the first and second electrodes is a porous electrode that is reversibly deformable under a compressive force and comprises an insulating elastomer and an electrically conducting material; and a liquid electrolyte disposed between the first electrode and the second electrode and infused into pores of the porous electrode that is reversibly deformable under the compressive force; wherein the porous electrode that is reversibly deformable under the compressive force is configured such that the reversible deformation of the porous electrode under the compressive force results in a change in the interfacial area between the porous electrode and the electrolyte, which causes a change in the capacitance of the supercapacitor.

In another aspect, a method of using the supercapacitor is provided. In an embodiment, the method comprises applying the compressive force to the porous electrode that is reversibly deformable under the compressive force to provide the change in the interfacial area between the porous electrode and the electrolyte, thereby causing the change in the capacitance of the supercapacitor.

In another aspect, an electrical circuit is provided. In an embodiment, the electrical circuit comprises the supercapacitor and an external load connected between the first electrode and the second electrode.

In another aspect, a method of using the electrical circuit is provided. In an embodiment, the method comprises applying the compressive force to the porous electrode that is reversibly deformable under the compressive force, wherein the interfacial area between the porous electrode and the electrolyte decreases, thereby decreasing the capacitance of the supercapacitor and inducing a current to flow from one of the first and second electrodes through the external load.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIGS. 2A-2H show scanning electron microscope (SEM) images of the following: pristine PU foam (FIGS. 2A, 2B); polyurethane (PU)-reduced graphene oxide (rGO)-1 (FIGS. 2C, 2D); PU-rGO-3 (FIGS. 2E, 2F), and PU-rGO-5 (FIGS. 2G, H). Insets in FIGS. 2E and 2G are cross-sectional images showing measured thicknesses of the rGO coating using FIB, 570±185 nm and 1260±220 nm, respectively.

FIG. 3A shows high-resolution XPS C1s spectra, FIG. 3B shows high-resolution XPS N1s spectra.

FIGS. 5A-5H show SEM images of PU-rGO-3 foam at different compressive strains (vertical compression): (FIG. 5A) 0%, (FIG. 5B) 10%, (FIG. 5C) 20%, (FIG. 5D) 30%, (FIG. 5E) 40%, (FIG. 5F) 50%, (FIG. 5G) 60%, and (FIG. 5H) 70%. The scale bar is 300 µm.

FIG. 6A shows the resistance of a PU-rGO-3 foam at different compressive strains after 2, 50, and 100 repeated cycles of compression. FIG. 6B shows the resistance of PU-rGO-1, 3, 5 samples as a function of applied compressive strain after 100th cycle of compression.

FIG. 8A is a schematic cross-sectional diagram of a coating of stacked graphene layers (black) on a PU substrate (gray). FIGS. 8B and 8C show the cross-sectional diagram after bending due to compression, showing tension-induced formation of micro-fracture.

FIG. 8D is a SEM image of PU-rGO-3 under 70% compression strain, exhibiting facial micro-cracks of the rGO coating.

FIG. 9 shows a scheme of the steps employed to form a PU-rGO foam sample.

FIG. 17A-FIG. 17E show the XPS spectra of (FIG. 17A) C is and (FIG. 17B) O is of G-PGH, (FIG. 17C) C 1s, (FIG. 17D) O 1s, and (FIG. 17E) Mn 3s of Mn-PGH.

DETAILED DESCRIPTION

Figure 1:
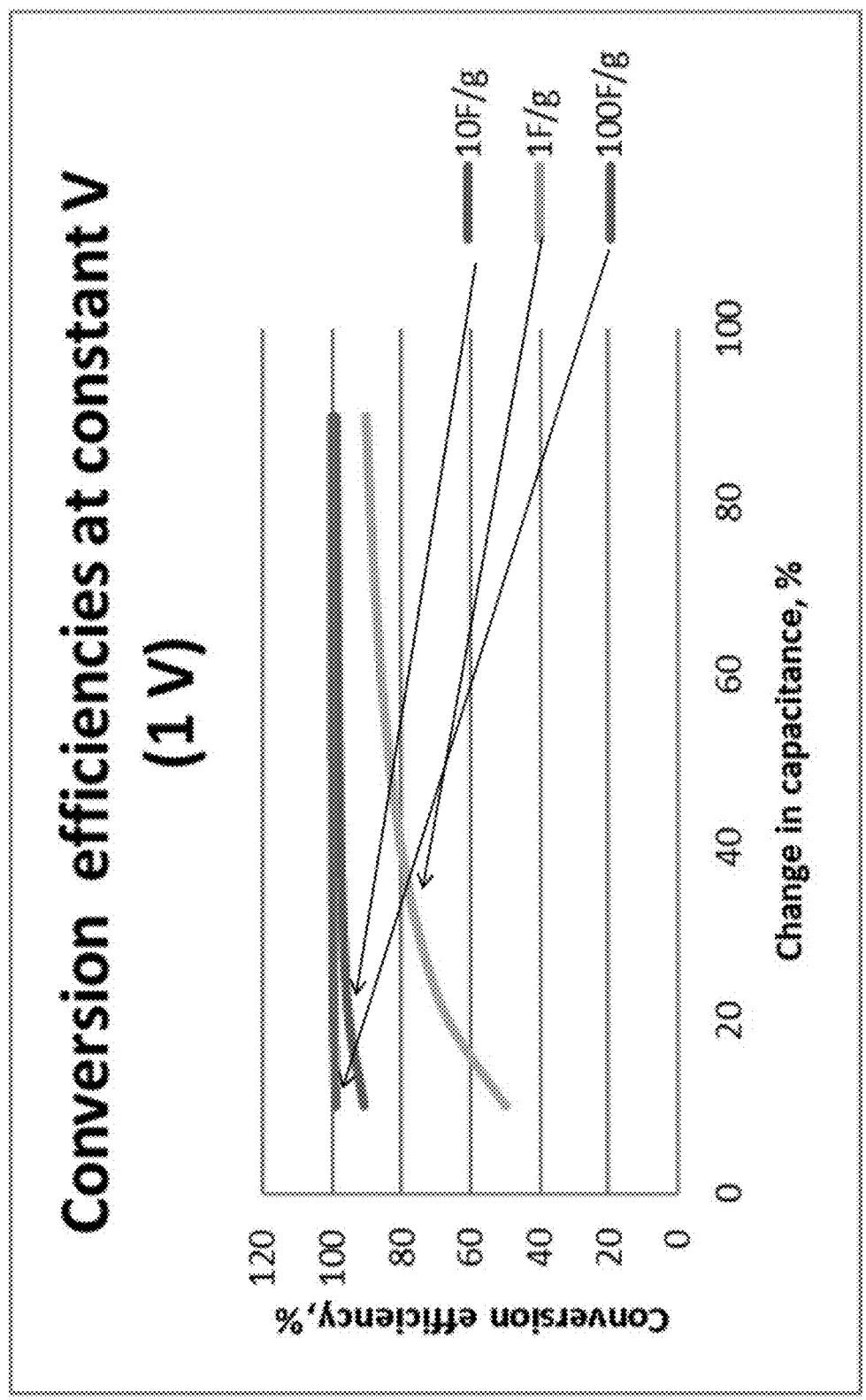
FIG. 1 shows the effect of the capacitance of an electrode material on energy conversion efficiency under conditions of 1 V charge and 50% strain.

Deformable electrodes, deformable supercapacitors comprising the deformable electrodes, and electric circuits comprising the supercapacitors are provided. Methods of using the supercapacitors to convert mechanical energy to electrical energy are also provided.

The supercapacitors comprise a liquid electrolyte disposed between two electrodes, at least one of which is reversibly deformable when it is compressed. In some embodiments of the supercapacitors, both electrodes are reversibly deformable when compressed. The liquid electrolyte is infused into the deformable electrode(s) and the supercapacitors are characterized in that the deformation of the deformable electrodes causes the interfacial area between the electrolyte and the deformable electrode(s) to change, either increase or decrease, when the electrodes are deformed. In the present disclosure, the term "interfacial area" refers to the area between the electrolyte and the deformable electrodes(s) through which electrons flow to and from an electrical connector of the supercapacitor, i.e., the electrically accessible area formed between the electrolyte and the deformable electrode(s). For example, the deformation may cause the liquid electrolyte to be compressed out of the electrode(s) and into the space between the electrodes or another reservoir in fluid communication with the electrode(s). As a result of the change in the interfacial area, the capacitance of the capacitor changes. When the capacitor is incorporated into a circuit, the changed capacitance can induce a flow of electrons through that circuit, supplying electricity to one or more electrical components in the circuit. The exact mode of deformation is not essential as long as the deformation causes a change in the capacitance of the electrode by changing the interfacial area between the electrode and the electrolyte.

The deformation can be caused by a compressive force applied to the electrode(s). The compressive force can be a regular, periodic force or random, but repetitive force may be provided by a variety of sources, including human motion or vehicle (e.g., bike, car, or train) motion, or natural or man-made vibrations in the environment, or rotation of an off-axis shaft. Even small amplitude and low frequency motions can be converted into electrical energy using the present supercapacitor device. This can be illustrated using the motion of a wheel of a motor vehicle.

Consider a 1000 kg (2200 lb) car oscillating at 1 Hz with an amplitude of 5 cm (roughly 2 in), the quantity of mechanical energy E delivered by this motion in the compression cycle is: E/s=wgd=(1000 kg)(9.8 N/kg)(0.05 m/s)=490 J/s=490 W, where w, g, and d is the weight of the vehicle, the gravitational constant, and the displacement, respectively. In 10 h, this would have delivered 4.9 kWh of energy. This value is comparable to the average daily solar flux per sq meter in Arizona, New Mexico, Florida, and Nevada, which ranges from 3-8 kWh/$m^2$-$day^1$. Unlike solar panels, this mode of operation does not depend on weather condition or location. It is ideal for capturing a widely distributed source of energy that would otherwise be wasted. Another very attractive feature of this source of energy is that it is a byproduct of daily life activities that is wasted as heat and sound. That is, it is already available, and no extra work is needed to generate it for the purpose of conversion to electricity. This feature distinguishes its capture from the approach of using devices such as a bicycle electricity generator which requires extra pedaling work to operate.

At least some aspects of the inventions are based on two concepts that are well-established individually, but have not been applied together as described herein. The first concept is that the quantity of charge Q stored in an electrode of a capacitor is dependent on the capacitance of the electrode C and the voltage V, following the equation: Q=VC. Thus, in an open circuit configuration, any change in capacitance at constant Q in response to mechanical deformation would change the voltage V accordingly and the corresponding stored energy E, since: $E=\frac{1}{2}QV=\frac{1}{2}CV^2$. Similarly, if the voltage is fixed by an external circuit, a change in C would result in a change in the stored charge Q, which is accomplished by current flowing in or out of the electrode. In embodiments of the supercapacitors described herein, changes in C are caused by mechanical deformation of the electrode.

The second concept is that the specific capacitance (i.e. capacity per unit weight) of an electrode for a supercapacitor (also commonly known as double-layer capacitor or ultracapacitor) is directly related to the interfacial area between the electrode and the electrolyte, a region also known as the double layer. In a supercapacitor, the electrolyte is the ion-containing medium between the two electrodes. In embodiments of the supercapacitors described herein, the interfacial area is altered by mechanical deformation of a deformable electrode.

This second concept distinguishes the devices comprising the present supercapacitors from other mechanical to electrical energy conversion devices based on the deformation of a conventional parallel plate capacitor. In a conventional parallel plate capacitor, the capacitance is related to the geometric dimension (area A) of the electrode, the dielectric constant ε of the dielectric separator, and the separation distance d between the two electrodes according to the equation: C=εA/d. Using a conventional parallel plate capacitor, changing the capacitance of a capacitor by deformation would be by changing the separation distance d. Thus, the deformable component would be the separator, not the electrode.

Notably, the capacitance of a supercapacitor can be orders of magnitude (typically $10^4$-$10^8$ times) larger than the capacitance of a conventional parallel plate capacitor. Thus, much larger quantities of electricity can be generated using a supercapacitor than a parallel plate capacitor.

The efficiency to convert mechanical to electrical energy depends on the properties of the materials that constitute the deformable electrode(s). It can be expressed as: $N_{eff}=E_{elect}/E_{def}$, where $N_{eff}$ is the efficiency of converting energy consumed in deforming the charged electrode in the device, $E_{def}$, into electrical energy, $E_{elect}$. Contributions to $E_{def}$ include the energy for the mechanical deformation of the solid electrode, $E_{comp}$, the energy associated with movement of the electrolyte during deformation, $E_{lyte}$, and other losses such as electrical resistance, which are grouped into the term $E_{loss}$, as well as the electrical energy generated, $E_{elect}$. Thus, $N_{eff}=E_{elect}/(E_{comp}+E_{lyte}+E_{loss}+E_{elect})$.

In order to maximize $N_{eff}$, the electrode material desirably has a small deformation modulus, such as compressive modulus, and a high electrical conductivity. In addition, the viscosity of the electrolyte should be low and ion mobility high, and any other properties that would minimize ($E_{comp}$+$E_{lyte}$+$E_{loss}$) should be taken into account.

Examples of materials suitable for the deformable electrodes include, but are not limited to, graphene sheets or foams, reduced graphene oxide sheets or foams, polymer foams coated with a high gravimetric surface area electrically conducting material suitable for supercapacitor electrode applications, such as a graphene layer, a reduced graphene oxide layer, or a carbon layer. Composites, including carbon nanotube-graphene, carbon nanotube-reduced graphene oxide, graphene-carbon particle, and their mixtures combined with elastomeric materials also may be used. In the composites, the electrically conducting materials may be coated onto a polymeric elastomer support, or polymer elastomer particles may be dispersed in a network of electrically conducting material. Examples of polymeric elastomers suitable for use in the electrodes include polyurethanes and polysiloxanes.

Further guidance regarding appropriate materials for the deformable electrodes having high conversion efficiencies can be based on the following considerations: 1) the volumetric capacitance of the electrodes is desirably as high as possible; 2) the change in capacitance with compressive strain on the electrode is desirably as high as possible; 3) the energy required to deform the electrode, measured by parameters such as compressive modulus of the electrode material is desirably as low as possible; 4) the electrical conductivity of the electrodes is desirably as high as possible to minimize ohmic losses; and 5) the viscosity of the electrolyte is desirably as low as possible to minimize ohmic losses.

Further guidance regarding appropriate materials for the deformable electrodes having adequate compressive deformation can be based on the following considerations: 1) the materials desirably have a low compression set value so that the electrodes can undergo many reversible deformation cycles without altering their function; and 2) the material should have excellent rebound resilience.

As noted above, in embodiments, the deformable electrode(s) comprises a porous, elastomer matrix, e.g., an elastomeric foam, and an electrically conducting material coated on the surface of the matrix (e.g., on both the inner and outer surfaces of the matrix). As noted above, the electrically conducting material may be a high volumetric surface area coating material. The elastomer matrix desirably has a high volumetric interfacial area due to a highly porous nature of the underlying elastomeric foam and the electrically conducting coating material on the surface of the matrix. The elastomer matrix may be characterized by the size and morphology of its pores. The pores may be substantially spherical, although the shape is not particularly limiting. (See FIG. 2A.) The average diameter of the pores (e.g., the average value of the diameters of a representative number of pores as measured from scanning electron microscope (SEM) images) may range from about 5 μm to about 500 μm, including from about 50 μm to about 500 μm, or from about 100 μm to about 500 μm. The pores of the elastomer matrix may include openings so that neighboring pores are interconnected. (See the openings in FIG. 2A.) These "openings" may have a variety of shapes and sizes as described above with respect to the pores. However, the openings may have sizes which are smaller (including less than 1 μm) than the larger pores described above. A hierarchical arrangement of pores of different sizes (e.g., including pores and their openings), ranging from <1 μm to 500 μm, may be desirable for an optimum balance between high interfacial area per unit volume of electrode and resistance to flow of liquid electrolyte during mechanical deformation.

The elastomer matrix, which provides mechanical robustness and compressibility, may comprise one or more types of elastomers. In embodiments, the elastomer is insulating.

In this case, the conductivity of the elastomer matrix is provided by the electrically conducting material coated thereon. As noted above, polyurethane and polysiloxane are illustrative examples of insulating elastomers. The term "insulating" refers to having a conductivity which is equal to or less than the conductivity of the polyurethane foam described in Example 1, below (BJB Enterprises (Tustin, Calif., Type TC-266(50/100)). In embodiments, the elastomer matrix and the deformable electrode(s) are substantially free of a conductive, noncompressible polymer, e.g., substantially free of polyaniline, polypyrrole, poly(3,4-ethylenedioxythiophene) polystyrene sulfonate, polythiophene, polyfuran, sulfonated polyaniline, sulfonated polypyrrole, sulfonated polythiophene, sulfonated polyfuran, sulfonated polyacetylene, and the like.

The coating of the electrically conducting material may be further characterized by its average thickness (e.g., the average value of the thickness of the coating at a representative number of locations throughout the matrix as measured from SEM images). The average thickness may be at least about 200 nm, at least about 400 nm, at least about 700 nm, or at least about 1 µm. Illustrative electrically conducting materials include graphene, reduced graphene oxide, or carbon. In another embodiment, a deformable electrode may comprise a polyurethane foam coated by a layer of an inert metal, e.g., gold.

In another embodiment, the deformable electrode(s) comprises an elastomeric foam which is intrinsically conducting by virtue of the material of the elastomeric foam, e.g., by using compressible graphene or reduced graphene oxide foams. In this embodiment, the pore shapes and sizes described above apply to the conducting elastomeric foam.

The deformable electrode(s) may be characterized by its conductivity as determined by measuring the resistance of an uncompressed (i.e., 0% compressive strain) deformable electrode (see the initial data points in FIG. 6B). In embodiments, the deformable electrode is characterized by a resistance of no more than about 500Ω at 0% compressive strain, no more than about 100Ω at 0% compressive strain, or no more than about 5Ω at 0% compressive strain. In embodiments, the deformable electrode is characterized by high conductivity values (low resistance) over a range of compressive strains. That is, the deformable electrode exhibits high conductivity at both high and low compressive strains. In such embodiments, the deformable electrode can exhibit the resistance values described above over a range of 0% to 70% compressive strain. In embodiments, the deformable electrode is characterized by conductivity (resistance) values which do not change significantly as a function of compressive strain. In such embodiments, the deformable electrode can exhibit a resistance that changes by no more than about a factor of 10, no more than about a factor of 7, or no more than a factor of about 2 over a range of 0% to 70% compressive strain. The high values of conductivity may be achieved by using relatively thick coatings of an electrically conducting material and, for reduced graphene oxide, by maximizing the degree of reduction, e.g., by using the method described in Example 1, below.

The deformable electrode(s) may be characterized by its compressive modulus as measured over the linear, elastic region of its strain-stress curve obtained under compressive loading as described in Example 1, below. In embodiments, the compressive modulus is in the range of from 0.01 MPa to 0.3 MPa or from 0.01 MPa to 0.05 MPa. The deformable electrode(s) may be characterized by its compressive set value. In embodiments, the compressive set value is in the range of from 0 to 0.05 or from 0 to 0.005. Known methods such as ASTM D395, Method A, may be used to determine compression set values.

As noted above, the deformable electrode(s) are characterized in that they are reversibly deformable, i.e., they return to their original shape after compressive loading. The existence of reversible deformation may be confirmed via strain-stress curves obtained under cyclic compressive loading as described in Example 1, below. Reversible deformation may be evidenced by strain-stress hysteresis loops that remain substantially unchanged after multiple cycles. In embodiments, the strain-stress hysteresis loops remain substantially unchanged over at least 500 cycles, at least 1000 cycles, or at least 10,000 cycles.

The deformable electrode(s) may be characterized by the magnitude of the change in capacitance obtained upon compression. In embodiments, the deformable electrode(s) exhibits a change in capacitance of 0.5 F/in$^3$ or greater at 70% compressive strain, 0.7 F/in$^3$ or greater at 70% compressive strain, 5 F/in$^3$ or greater at 70% compressive strain or even about 50 F/in$^3$ at 70% compressive strain.

Example 1 below describes an illustrative method and conditions for forming a deformable electrode comprising a porous, elastomer matrix in the form of an elastomer foam, and an electrically conducting material coated on the surface of the matrix. As noted above, this Example also describes the techniques for confirming the conductivity (low resistance), capacitance and compression properties of the deformable electrode.

Examples of conversion efficiencies can be estimated using known properties of elastomeric electrical conductors suitable for use as supercapacitor electrodes, such as reduced graphene oxide-coated polyurethane, as illustrated in the embodiments that follow.

Embodiment 1

An elastomeric electrode is made of 1 g of a reduced graphene coated polyurethane foam and has a capacitance of 10 F/g. When the electrode is compressed to 50% strain, the average compressive stress is 0.1 MPa. The total energy loss $(E_{comp}+E_{lyte}+E_{loss})$ is assumed to be twice the energy consumed due to mechanical deformation $E_{comp}$. The electrode has a dimension of 1 cm$^3$, and the electrode is charged to 1V before compression.

In case 1, the electrode is maintained at 1 V when a force equivalent to the compressive strain is applied to compress the electrode by 50%. Thus, $E_{comp}=(0.05$ MPa$)(1$ cm$^2)(0.5$ cm$)=0.025$ J, and $(E_{comp}+E_{lyte}+E_{loss})=0.05$ J. The electrical energy generated is: $E_{elect}=V^2\Delta C=V\Delta Q$, where $\Delta C$ is the change in capacitance, and $\Delta Q$ is change in the stored charge. Thus, $E_{elect}=5$ J and $N_{eff}=98\%$.

In case 2, the charged electrode is placed in an open circuit, so that the quantity of stored charge remains unchanged when the electrode is deformed. Since the energy loss terms are independent of the electrical circuit and its mode of operation, $E_{comp}$ and $(E_{comp}+E_{lyte}+E_{loss})$ are the same as in case 1, being 0.025 J and 0.05 J, respectively. In this mode of operation, $E_{elect}=\frac{1}{2}Q\Delta V=\frac{1}{2}Q^2(1/C_2-1/C_1)=\frac{1}{2}(C_1V_1)(V_2-V_1)$, where $C_1$ and $V_1$ are capacitance and voltage before deformation, and $C_2$ and $V_2$ are those after deformation. Q is the quantity of stored charges, and $\Delta V=V_2-V_1$.

For the values in this case for 50% compression, $V_2=2$ V, and $V_1=1$ V, such that $E_{elect}=5$ J and $N_{eff}=98\%$.

Embodiment 2

The material of Embodiment 1 is used and the same operation with constant voltage is applied, except that different capacitance changes due to deformation are examined for material with three different gravimetric capacitance: 1 F/g, 10 F/g, and 100 F/g. The results are shown in FIG. 1.

Embodiment 3

The material of Embodiment 1 is used and the same operation with constant voltage is applied, except that the average stress for 50% strain varies from 0.1 MPa, 1 MPa, to 10 MPa. Table 1 shows the effect on conversion efficiency.

TABLE 1

Effect of compressive stress on energy conversion efficiency, 1 V charge, 50% strain.

| Stress | $N_{eff}$% |
|---|---|
| 0.1 Mpa | 99 |
| 1 Mpa | 83 |
| 10 Mpa | 33 |

Embodiment 4

The material of Embodiment 1 is used and the same operation with constant voltage is applied, except that the electrode is charged to different initial voltages, and the total energy loss of 0.1 J and 1 J are examined. Table 2 shows the effects of these changes on conversion efficiency.

TABLE 2

Effect of initial voltage and total energy loss on energy conversion efficiency.

| | $N_{eff}$% | |
|---|---|---|
| V | $E_{loss}$ = 0.1 J | $E_{loss}$ = 1 J |
| 0.5 | 93 | 56 |
| 1 | 98 | 83 |
| 1.5 | 99 | 92 |
| 2 | 99.5 | 95 |
| 3 | 99.8 | 98 |

In further embodiments, such as those described in Example 3, below, the deformable electrode(s) may comprise a porous elastomer matrix (e.g., an elastomer foam); an electrically conducting material coated on the surfaces of the elastomer matrix and within the pores of the elastomer matrix; hydrophobic particles distributed (e.g., homogeneously) throughout, and embedded within, the electrically conducting material; and a hydrogel polymer distributed (e.g., homogeneously) throughout the electrically conducting material. The material within the pores of the elastomer matrix (i.e., the electrically conducting material, the hydrogel polymer and embedded hydrophobic particles) may effectively assume a particulate form (and may be referred to as particles) due to the surrounding porous framework provided by the elastomer matrix. (See FIGS. 15A-15D.)

Regarding the hydrophobic particles, various sizes and shapes may be used. In embodiments, the hydrophobic particles are spherical in shape, but this encompasses irregularly shaped particles that have three dimensions of similar magnitude. (See FIGS. 14A, 14B). In embodiments, the hydrophobic particles have an average diameter in the range of from about 500 nm to about 1000 nm, from about 1 µm to about 1.5 µm, or from about 5 µm to about 10 µm. Various materials may be used for the hydrophobic particles, including electrically conductive materials. In embodiments, the hydrophobic particles are composed of graphite. In embodiments, the hydrophobic particles are composed of a transition metal oxide, e.g., $MnO_2$. Combinations of different types of hydrophobic particles may be used. The deformable electrode(s) may contain various amounts of the hydrophobic particles. The amount may be selected to provide a desired property, e.g., a desired conductivity or change in capacitance upon compression as described above.

Regarding the hydrogel polymer, various types of such polymers may be used. An illustrative hydrogel polymer is polyvinylpyrrolidone. The deformable electrode(s) may contain various amounts of the hydrogel polymer. The amount may be selected to provide a desired property, e.g., a desired compressive modulus as described above.

A method for making a deformable electrode comprising hydrophobic particles and a hydrogel polymer is described in Example 3, below. Briefly, such a method may comprise spray drying a suspension (e.g., using an alcohol) of the hydrogel polymer, the hydrophobic particles, and the electrically conducting material (or precursor thereof such as graphene oxide to provide graphene). The spray drying forms a plurality of graphene oxide-wrapped hydrophobic particles. (See FIGS. 14B, 14D.) Next, the method may comprise forming a mixture (e.g., in an alcohol) of a reducing agent, graphene oxide, and the graphene oxide-wrapped hydrophobic particles. Next, the method may comprise immersing an elastomer foam in the mixture at an elevated pressure and an elevated temperature for a period of time. These hydrothermal conditions reduce the graphene oxide to graphene and provide the deformable electrode described above.

Deformable electrodes formed according to Example 3 may be characterized by their conductivity, compressibility and change in capacitance as described above. (See FIGS. 16-19A-19D.)

As noted above, in embodiments, the deformable electrode(s) comprises a porous, flexible matrix of an electrically conducting material and a plurality of elastomer particles dispersed throughout the matrix. The plurality of elastomer particles may be homogeneously distributed throughout the matrix. They may be freely dispersed or covalently bound to the matrix. (See, e.g., FIGS. 11A-11B.) Contact between the plurality of elastomer particles effectively blocks a liquid electrolyte infused within the matrix from accessing the matrix. In this embodiment, upon compression of the deformable electrode(s), the plurality of elastomer particles responds by deforming to "wet" the matrix. (See FIG. 10.) That is, the area of contact between the elastomer particles and the matrix increases resulting in a decrease in the interfacial area between the liquid electrolyte and the matrix and thus, a decrease in capacitance.

The porous, flexible matrix may be characterized by the size and morphology of its pores. However, the shape and size of the pores is not particularly limited provided the pores can accommodate the plurality of elastomer particles (see below). The electrically conducting materials described above may be used to provide the porous, flexible matrix, provided they exhibit both high conductivity and flexibility. Particularly suitable materials include graphene sheets, reduced graphene oxide sheets and carbon nanotubes. Other suitable materials include polymeric fibers and inorganic fibers. In embodiments in which the electrically conducting material is graphene sheets or reduced graphene oxide sheets, the sheets may be substantially aligned in a direction perpendicular (e.g., horizontally aligned) to the direction of the compression. (See FIG. 10.)

The plurality of elastomer particles may be characterized by their shape and size. The particles are generally globular and may be characterized as being spherical, egg-shaped, or elliptical. (See FIG. 10.) The average diameter (or width) of the particles (e.g., the average value of the diameters (widths) of a representative number of particles as measured from SEM images) may be in the range of from about 20 nm to about 100 nm.

As with the elastomer matrix described above, the elastomer particles may comprise one or more types of elastomers, including insulating elastomers. As noted above, polyurethane and polysiloxane are illustrative examples of insulating elastomers. Polyisoprene is another example. These insulating elastomers meet the following criteria: high Poisson's ratio, high bulk modulus, low compressive stress and low shape factors, low shear modulus, low compression set value, and good rebound resilience.

In this embodiment, the resulting deformable electrode may also be characterized by any of the conductivity (reported as resistance), compression properties (compressive modulus, compressive set value, reversible deformation), and capacitance properties (change in capacitance upon compressive loading) described above with respect to the deformable electrode comprising the porous, elastomer matrix and the electrically conducting material coated on the surface of the matrix.

Example 2 below describes illustrative methods and conditions for forming a deformable electrode comprising a porous, flexible matrix of an electrically conducting material and a plurality of elastomer particles dispersed throughout the matrix. This Example also describes how the cross-linking in graphene sheets, including reduced graphene oxide sheets, oxygen content, and defects in such sheets may be adjusted to achieve the desired conductivity, capacitance and compression properties. Similarly, this Example also describes how the size of the elastomer particles, the molecular weight of the elastomer, and cross-linking in the elastomer may be adjusted to achieve the desired compression properties.

The type of liquid electrolyte used in the supercapacitor is not particularly limited, although the viscosity of the liquid electrolyte is desirably minimized as described above. Examples of liquid electrolytes include, but are not limited to, aqueous solutions of sulfate or chlorides of potassium, calcium, and magnesium, and ionic liquid solutions.

The supercapacitor may include other components typically found in conventional supercapacitors, e.g., ion-permeable separators.

As noted above, the supercapacitor may be part of an electrical circuit comprising any of the disclosed supercapacitors and an external load connected between the first and second electrodes. The type of circuit and external load is not particularly limiting. In an embodiment, a method of using the electrical circuit comprises applying a compressive force to the electrode or electrodes that are deformable under a compressive force, wherein the interfacial area between the electrode or electrodes and the electrolyte decreases, thereby decreasing the capacitance of the supercapacitor and inducing a current to flow from one of the first and second electrode through the external load.

EXAMPLES

Example 1: Supercapacitors Based on Porous Electrodes Comprising Polyurethane Coated with Electrically Conducting Reduced Graphene Oxide For the purpose of high electrical conductivity, stacking and overlapping of the conducting component that provides a continuous path is more desirable than distributing it uniformly within the elastomeric matrix. That is, it is desirable to coat the walls (both interior and exterior) of a porous elastomeric matrix with a conducting, electrochemically active layer rather than dispersing the conducting material in the matrix. Because the two phases are physically distinct in such a composite, their individual properties can be tuned independently to generate a highly conductive, electrochemically active, and deformable 3D material. Although there are a number of literature reports on such coated material using reduced graphene oxide (rGO) as the conductive phase and porous polyurethane (PU) foam as the elastomeric supporting matrix,[2-4] only two reports investigated the electrical conductivity that was found to be low.[5,6]

This example illustrates the successful preparation of an rGO-PU foam composite of high electrical conductivity, its mechanical properties, and its application as an electric double layer capacitor electrode after subjecting it to severe deformation upon applied mechanical strain. The deformation led to the formation of surface defects that had not been observed previously in graphene-based 2-D electrode systems. By increasing the thickness and the degree of reduction of the rGO coating, it was possible to generate elastomeric materials of high electrical conductivity. In order to achieve this, a preparation procedure was devised that is compatible with the hydrophobic rGO and the hydrophilic PU, while ensuring good adhesion and electrical contact between these two phases in the composite.

The rGO-PU foam composite was prepared from an as-received PU foam, which had open, spherical, and interconnecting pores that averaged 500 μm in diameter (FIG. 2A), that were packed tightly and separated by thin PU walls. The openings (necking) connecting adjacent pores were >100 μm in size on average. Three samples, with 1, 3, or 5 coatings of rGO, labeled PU-rGO-1, PU-rGO-3, and PU-rGO-5, respectively, were synthesized. Their weight loadings of rGO materials were 2, 4.7, and 7.2 wt. %, respectively, as determined by comparing the weights of pristine PU samples and PU-rGO samples after processing. PU-rGO-1 (FIG. 2C, 2D) showed a thin coating of non-uniform thickness, PU-rGO-3 showed a more uniform coatings of about 600 nm, and PU-rGO-5 showed a rather rough coating of about 1200 nm thick with evidence of some loose rGO flakes on the surface (FIG. 2G).

The PU substrate retained its original shape and pore structure after deposition and reduction of the coatings (FIG. 2C, 2E, 2G), although there appeared to be narrowing of necking. The rGO coatings on all samples adhered well to the PU and showed no obvious signs of delamination even after repeated high-strain compression.

Figure 3C:
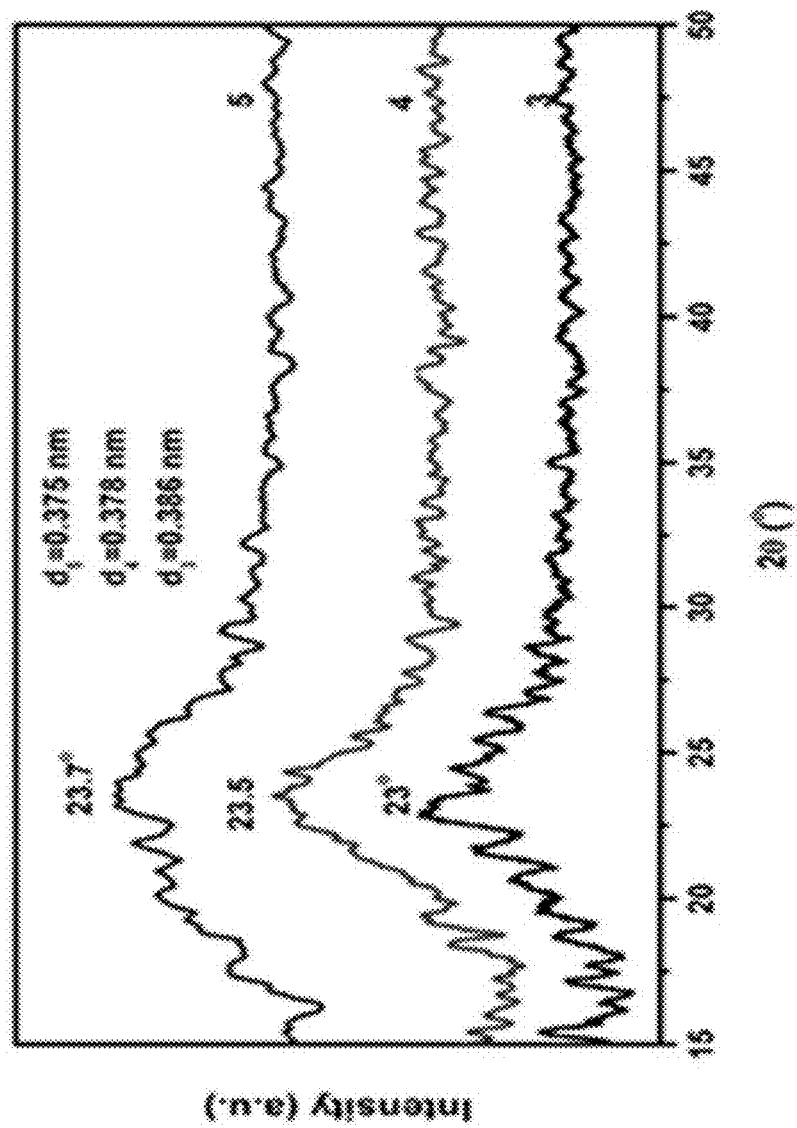
FIG. 3C shows XRD patterns of samples. Curve labels: 1: PU foam, 2: one-layer GO coated PU foam after soaking in ethylenediamine for 5 min at room temperature, 3: one-layer GO coated PU foam after ethylenediamine-assisted hydrothermal reduction, 4: PU-rGO-1, and 5: one-layer GO coated PU foam reduced by hydrazine directly without the ethylenediamine-assisted hydrothermal reduction step.

The chemical compositions of the rGO coatings after ethylenediamine-assisted hydrothermal reduction and hydrazine reduction were investigated with XPS. Noticeably higher C/O atomic ratios were detected on samples after reduction with either method (FIG. 3A). The C1s spectrum showed the signals of C=C bonds at 284.8 eV, C—O bonds at 286.7 eV which overlapped with the peak of C—N, and C=O bonds at 288.4 eV. Using ethylenediamine in the preparation introduced small but detectable amounts of N-doping in the rGO coating. The XPS N1s spectrum (FIG. 3B) showed peaks at 398.4, 400, and 401.3 eV assigned to pyridinic, pyrrolic, and quaternary nitrogen, respectively, with the latter encompassing N in the graphene structure and N in R—$NH_3^+$.[7]

In order to obtain interlayer spacing between rGO sheets in the coating, a piece of rGO coating on the external surface of PU foam was removed using Scotch tape. XRD patterns of the coating (FIG. 3C) indicated that the interlayer stacking separation was smaller for the samples reduced with hydrazine than with ethylenediamine. This was consistent with the more severe degree of reduction and conversion of quaternary N into pyrrolic N achieved with hydrazine, since dipolar and electrostatic repulsion between surface oxygen groups and quaternary N groups keep adjacent layers from close contacts.

Figure 4:
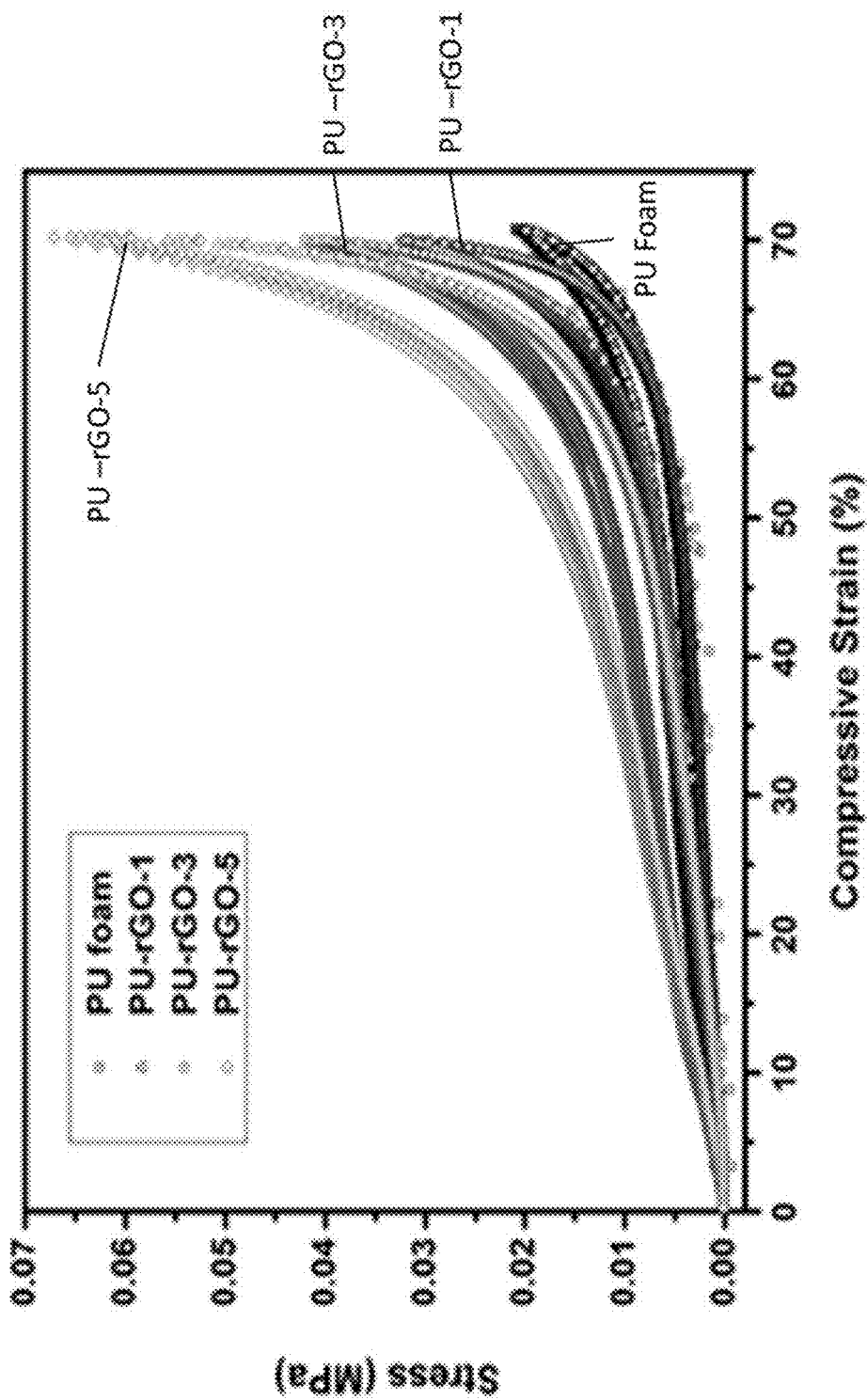
FIG. 4 shows Compressive stress-strain (S—S curves) of PU, PU-rGO-1, -3, and -5 foams. Overlapping data from multiple cycles (up to 200 cycles) are shown.

The compressive strain-stress (S—S) curves of PU and PU-rGO foams are shown in FIG. 4. The PU foam was highly deformable with a low Young's modulus up to 50-60% strain, after which the elastic modulus increased rapidly due to densification of the porous material. The compression behavior was highly reversible, and no permanent changes could be detected after many repeated (>1000) cycling. The S—S curves for all PU-r-GOs followed a similar behavior except that the elastic modulus increased systematically with increasing coating thickness. The behavior of all coated samples was also highly repeatable after the first 5-10 cycles, when a few loose flakes of rGO broke off the foam.

Structural deformation of the PU-rGO composites under compression was investigated by SEM, and the data for PU-rGO-3 foam are shown in FIGS. 5A-5H. Up to about 20% strain, the deformation was mostly due to bending of the pore walls (FIGS. 5A-5C). This corresponded to the linear region in the S—S curve in FIG. 4. Between 20-60% strain (FIGS. 5D-5F), collapse of pore openings began to occur, which corresponded to the plateau (or more gently sloping) region in the S—S curve. At high strain (>60%) (FIGS. 5G, 5H), the composite underwent densification and began to exhibit a modulus approaching that of solid bulk material. These structural changes were similar to those observed based on X-ray tomography (data not shown), and consistent with literature findings on the deformation mode of porous polyurethane foam.[8] Importantly, there was no obvious detachment of rGO coating from the PU matrix throughout the cycling process.

The electrical conductivities of the composite samples were determined from I-V scans at different compressive strains. In all cases, the current across the foam increased linearly as applied voltage increased, as exemplified by the behavior of PU-rGO-3 (data not shown). FIG. 6A shows the resistance of PU-rGO-3 at various levels of strain up to 70% during repeated cyclic deformation. The overall resistance of the sample stabilized after first few (~10) cycles of deformation when loose pieces of rGO fell off. FIG. 6B shows the dependence of resistance on coating thickness. PU-rGO-1 with the thinnest coating exhibited the highest resistance, ~20 kΩ, three orders of magnitude larger than the other samples. The resistance dropped markedly to ~65-~470Ω for PU-rGO-3 and ~20-~140Ω for PU-rGO-5. All three samples exhibited decreasing resistance with increasing compressive strain. As shown in the SEM (FIGS. 5A-5H) and X-ray tomography images (not shown), compression led to gradual closing of the open pores, which in turn generated new electrically conductive pathways and lower resistance. Although these resistance values were slightly higher than those of graphene or graphene-CNT only electrodes,[7,9] which is not surprising since the majority of the composite material was the insulating PU, the relatively low resistance of these composite foams suggested very efficient use of the graphene.

Figure 7:
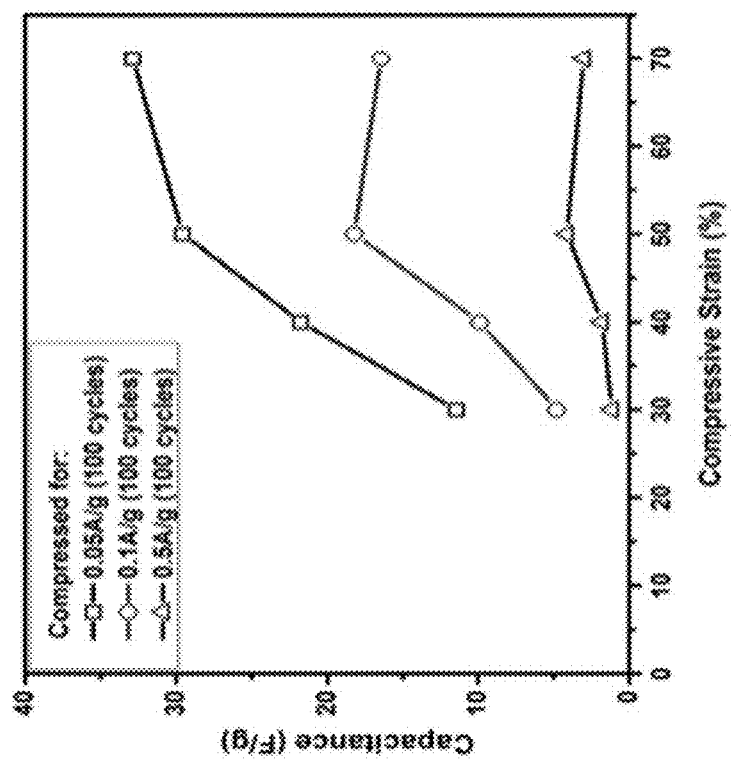
FIG. 7 shows the capacitance of a PU-rGO-5 foam electrode as a function of compressive strain.

The capacitance of PU-rGO-5 was measured as a function of compressive strain (FIG. 7). At the higher current densities of 0.1 A/g and 0.05 A/g, the capacitance increased from between 30% and 50% strain, then decreased at 70% strain. At a low current density of 0.05 A/g, the decrease at 70% strain was replaced by a slight increase. These electrochemical behaviors were reproducible even after many compression cycles.

There were two major contributing structural factors to the observed electrochemical behavior. One was closing of the open pores as described earlier, the other was creation of open facial micro-fractures under high strain. As shown in FIGS. 8A-8C, in the first few compression cycles, the tension on the stretched surface of a bent pore walls of the macroporous PU under compression led to the creation of facial-micro-fractures on the rGO coating, which was evident in the SEM images. In later cycles after these fractures were developed, compression up to about 50% strain would open the fracture and the exposed rGO edge planes provided added exposed surfaces to allow infiltration of electrolyte into the interlayer spacing between stacked graphene sheets, which resulted in the increased capacitance. When the strain was released, closing of the micro-fracture opening decreased the interfacial area, returning the sample closer to its original state, and the capacitance decreased. At higher strain than 50%, closing of macropores that decreased the exposed interfacial area began to contribute significantly. At high current when rate of ion transport limited participation of very small cracks, pore closing dominated the capacitance behavior, and a decrease in capacitance was observed. At low currents, where influence of ion transport was less prominent, the capacitance continued to increase but at a reduced rate.

EXPERIMENTAL SECTION

Preparation of PU-rGO. Pieces of polyurethane (PU) foam, 2.5*2.5*2.5 cm$^3$, were cut from larger stock pieces obtained from BJB Enterprises (Tustin, Calif., Type TC-266 (50/100)) and used as received. An aqueous suspension of 0.5 wt. % graphene oxide (GO) was prepared using the modified Hummer's method as described previously,[10] starting with flake graphite (Asbury Carbons, 230U Grade, High Carbon Natural Graphite 99$^+$). The procedure used for the fabrication of elastomeric, electrically conductive, and electrochemically active composite is shown schematically in FIG. 9. A piece of PU foam was submerged in 60 mL of the GO suspension for 2 h under high vacuum to remove trapped air within the porous structure. The soaked foam was removed carefully so as to retain as much of the absorbed liquid as possible, and then dried in vacuum overnight at 70° C. The dried sample was placed on a stainless mesh screen above a 20 mL aqueous solution of ethylenediamine (1 mg mL$^{-1}$, Sigma Aldrich) in a sealed 40 mL Teflon autoclave vessel. The setup was then heated to 100° C. for 4 h to initiate hydrothermal reduction of the GO coating. This coating process, from the initial vacuum dip-coating to the ethylenediamine-assisted hydrothermal reduction, could be repeated as many times as desired to obtain GO coatings of different thicknesses. After the desired number of coating cycles was completed, the sample was then submerged in 60 mL 65 wt. % aqueous hydrazine monohydrate solution (Sigma Aldrich) for 3 h at 80° C. for further reduction to form the reduced graphene oxide (rGO) coating. The sample was then gently washed with distilled deionized water and then vacuum dried overnight at 80° C.

Characterization.

Scanning electron microscopy images were collected with a high-resolution field emission scanning electron microscope (FESEM, Hitachi SU8030). To measure the thickness of rGO coating, a sample surface was ion-milled by FEI Helios Nanolab SEM/FIB to obtain a clear cross-sectional image of the PU bulk material with the rGO coating, the thickness of which was then measured digitally with ImageJ software. X-ray photoelectron spectroscopy (XPS) was performed using a Thermo Scientific ESCALAB 250Xi (Al Kα, 1486.6 eV). The stress-strain relationships were determined with a mechanical tester (MTS Sintech 20G), using a compression and rebound speed of 5 mm s$^{-1}$.

For electrical resistance measurements, aluminum foils serving as electrical contacts (Alfa Aesar, 0.025 mm, 99.99%) were pasted with silver conducting paste onto two opposing faces of a PU-rGO foam piece to improve electrical contact. A voltage ramp from 0 to 3 V was applied across the current collectors using a potentiostat/galvanostat system (Arbin Instruments BT2000), which recorded the current passing through the foam piece.

Electrochemical tests of a foam piece were carried out in a three electrodes setup, with PU-rGO composite as the working electrode, Ag/AgCl (CH Instruments) as the reference electrode, and Pt foil (Alfa Aesar, 0.025 mm, 99.9%) as the counter electrode. An aqueous solution of $K_2SO_4$ (0.5 M, Sigma Aldrich, 99% ACS) was the electrolyte. Using an electrochemical workstation (Autolab PGSTAT128N), current at densities of 0.05 A/g, 0.1 A/g, and 0.5 A/g, based on the weight of the active materials in the foam pieces, was applied to charge and discharge the sample over a voltage range of −0.2 to 0.6 V. Cyclic voltammetry (CV) was performed with a scan rate of 5 to 100 mV s$^{-1}$ for a voltage scan of 0 to 1 V using a potentiostat/galvanostat system (Arbin Instrument BT2000).

REFERENCES FOR EXAMPLE 1 AND BACKGROUND 1. http://rredc.nerl.gov/solar/old_data/nsrdb/1961-1990/redbook/sum2/state.html
2. Yao, H.-B.; Ge, J.; Wang, C.-F.; Wang, X.; Hu, W.; Zheng, Z.-J.; Ni, Y.; Yu, S.-H., A Flexible and Highly Pressure-Sensitive Graphene-Polyurethane Sponge Based on Fractured Microstructure Design. *Adv. Mater.* 2013, 25 (46), 6692-6698.
3. Krol, P.; Krol, B.; Pielichowska, K.; Spirkova, M., Composites prepared from the waterborne polyurethane cationomers-modified graphene. Part I. Synthesis, structure, and physicochemical properties. *Colloid Polym. Sci.* 2015, 293 (2), 421-431.
4. Hodlur, R. M.; Rabinal, M. K., Self assembled graphene layers on polyurethane foam as a highly pressure sensitive conducting composite. *Composites Sci. Technol.* 2014, 90, 160-165.
5. Chen, D.; Chen, G., In situ synthesis of thermoplastic polyurethane/graphene nanoplatelets conductive composite by ball milling. *J. f Reinforced Plastics and Composites* 2013, 32 (5), 300-307, 8 pp.
6. Ding, J. N.; Fan, Y.; Zhao, C. X.; Liu, Y. B.; Yu, C. T.; Yuan, N. Y., Electrical conductivity of waterborne polyurethane/graphene composites prepared by solution mixing. *J. Composite Mater.* 2012, 46 (6), 747-752.
7. Chang, Y. Z.; Han, G. Y.; Yuan, J. P.; Fu, D. Y.; Liu, F. F.; Li, S. D. A., Using hydroxylamine as a reducer to prepare N-doped graphene hydrogels used in high-performance energy storage. *J. Power Sources* 2013, 238, 492-500.
8. Elliott, J. A.; Windle, A. H.; Hobdell, J. R.; Eeckhaut, G.; Oldman, R. J.; Ludwig, W.; Boller, E.; Cloetens, P.; Baruchel, J., In-situ deformation of an open-cell flexible polyurethane foam characterised by 3D computed microtomography. *J. Mater. Sci.* 2002, 37, 1547-1555.
9. Kim, T.; Jung, G.; Yoo, S.; Suh, K. S.; Ruoff, R. S., Activated Graphene-Based Carbons as Supercapacitor Electrodes with Macro- and Mesopores. *ACS Nano* 2013, 7 (8), 6899-6905.
10. Zhao, X.; Hayner, C. M.; Kung, M. C.; Kung, H. H., In-Plane Vacancy-Enabled High-Power Si—Graphene Composite Electrode for Lithium-Ion Batteries. *Adv. Energy Mater.* 2011, 1 (6), 1079-1084.

Example 2: Supercapacitors Based on Porous Electrodes Comprising Particles of an Elastic Dielectric Material Embedded in a Porous Network of an Electrically Conducting Material Given a key parameter in determining capacitance of a supercapacitor is the electrode-electrolyte interfacial area inside the porous electrode, this Example changes the capacitance by using an electrode composite with an embedded elastic dielectric component that is designed to decrease the accessible electrode area in response to deformation upon compression. Changing capacitance—the capacity to store charges—causes a current to flow. This property of decrease in capacitance upon compression is opposite to the traditional parallel plate capacitors whose capacitance increases when the dielectric separator is compressed (see equation above).

Device Description.

Operationally, the supercapacitor has the capacity to deliver energy at the desired level. Technically, the choice of the elastic component and the conducting, charge storage component of the electrode material determines the efficiency of the device.

The principal component of the device where energy conversion occurs is the elastic electrode of a supercapacitor. The energy from compressing the electrode of a supercapacitor is converted to electrical energy in the form of current delivered by the supercapacitor.

Material for Supercapacitor Electrode.

As mentioned earlier, the capacitance of a supercapacitor, also referred to as double layer-capacitor or ultracapacitor, is mostly due to the charge accumulated at the electrode surface and the counter ions in the electrolyte in the double layer. This double layer is typically 1-2 nm thick, and located at the electrode-electrolyte interface where most of the potential drop occurs. Relative to the double layer, the potential drop across the separator between the two electrodes is small. The dimension of the double layer makes it impractical to attempt to mechanically modulate its thickness. Furthermore, practically all of the active electrode surface area is associated with pores inside the electrode, that is, interior to the electrode.

The concept employed here is to vary the capacitance by changing the interior, active surface area of the porous, conducting electrode, that is, the area exposed to the electrolyte. Since the capacitance of a supercapacitor is proportional to the accessible electrode-electrolyte interfacial area, by modulating the interfacial area with mechanical motion, charges flow into and out of the electrode. The deformation and shape recovery of the elastomeric material embedded in the electrode is leveraged to alter the extent the elastomeric material blocks the active area of the electrode, in response to the compression/relaxation experienced by the electrode.

Figure 10:
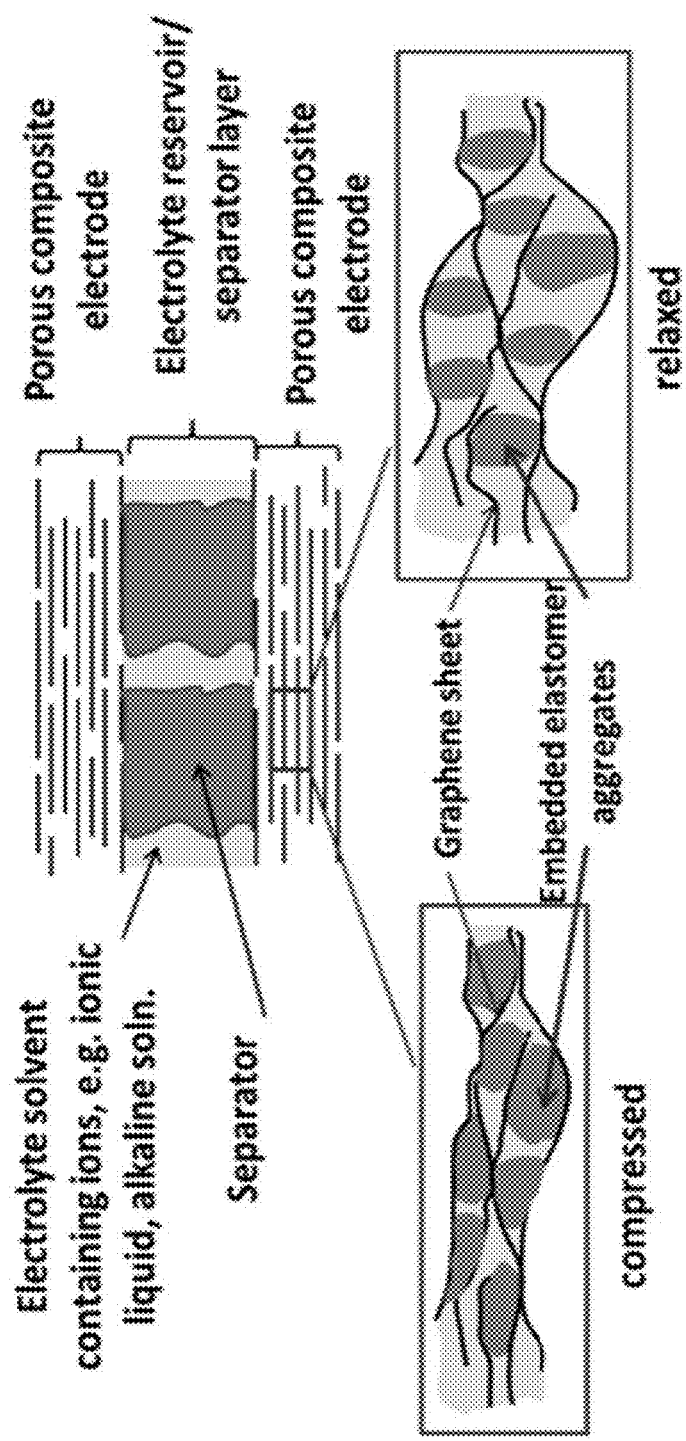
FIG. 10 shows a schematic diagram of a compressible supercapacitor for mechanical to electrical energy conversion according to another illustrative embodiment. The top portion is a cross-sectional drawing of the supercapacitor and the two boxes below illustrate the different degrees of wetting of the internal electrode surface by the elastomer during compression and relaxation.
Figure 11A:
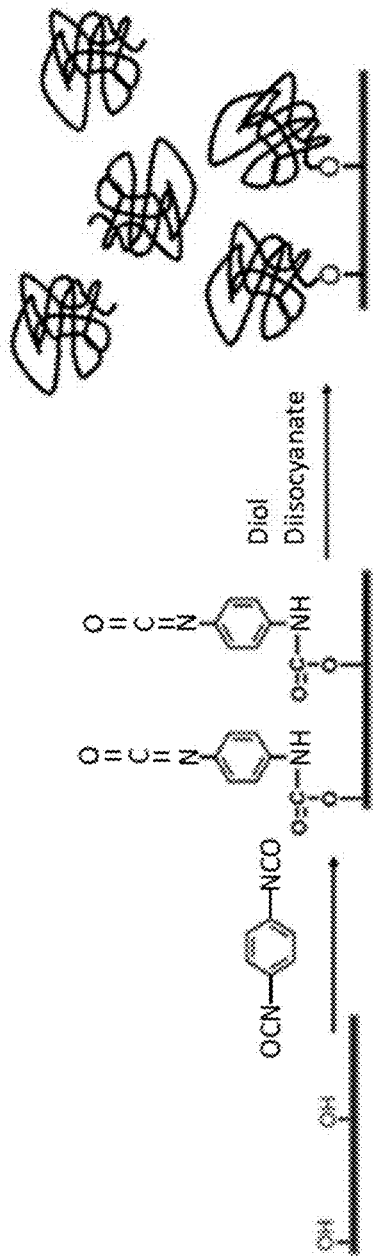
FIG. 11A shows a reaction scheme to form anchored polyurethane to a graphene oxide surface and FIG. 11B shows a reaction scheme to form anchored polysiloxane on a graphene oxide surface.
Figure 11B:
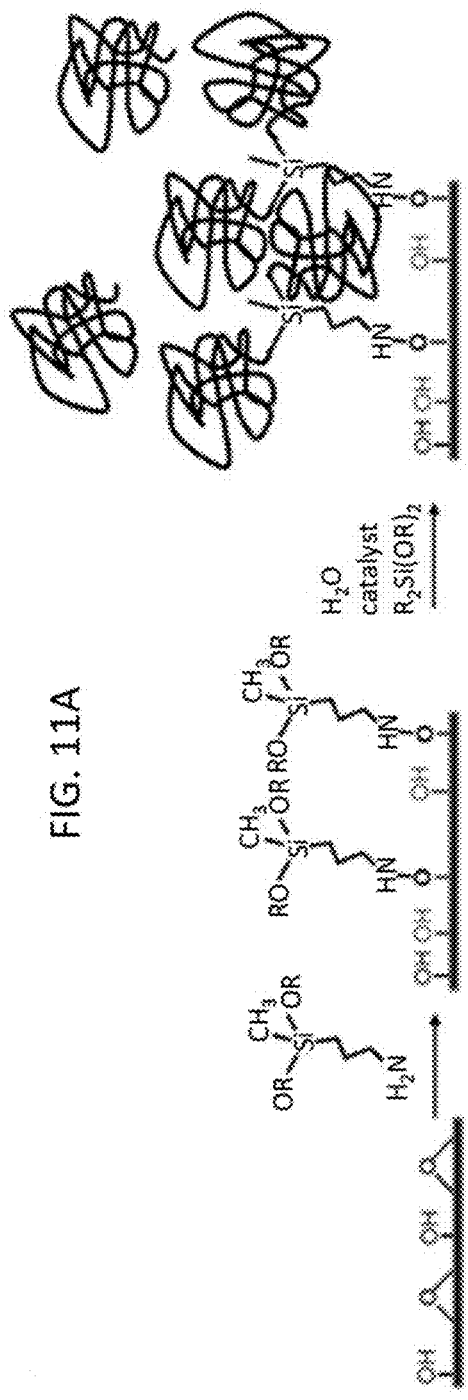

One embodiment of this concept is illustrated with the cartoon in FIG. 10, where the lower portion depicts the response of the components upon mechanical deformation due to compression. The electrode, made of a porous, conducting network of a flexible conducting material, is infused with a liquid electrolyte and dielectric elastomer aggregates having cross-sectional dimensions of tens to hundreds nanometer in size. When the electrode is compressed, the elastomer aggregates deform, covering a much larger portion of the electrode surface and shielding it from the electrolyte. When decompressed, the elastomer returns to its original shape, reducing its coverage of the electrode surface. Since the electrolyte can only access the exposed electrode surface not blocked by the elastomer, deformation of the elastomeric aggregates alters the electrode active area and, therefore, the capacitance. At a fixed voltage, the process causes charges to flow into and out of the supercapacitor, converting mechanical energy into electrical energy. The rest of the device includes a separator to separate the two electrodes and a reservoir for the electrolyte that is displaced from the electrodes during compression.

In one working model, two components constitute the elastic composite electrode: a flexible, electrically conducting material in the form of a matrix that forms the deformable (compressible) electrode framework, and a dielectric elastomeric material in the form of nanoparticles homogeneously dispersed in the matrix. The requirement that the conducting material be flexible excludes many current electrode materials, such as granular activated carbon or metal mesh. Suitable materials include conducting carbon nanotubes, graphene sheets, polymeric fibers, and inorganic fibers that form flexible mats. Among these, graphene sheets are well-suited for this application because of their high mechanical strength, flexibility, and electrical conductivity.[1]

The common method to produce graphene sheets in large quantities is by exfoliation of graphite with solution processing. Exfoliation of graphite directly into graphene sheets can be accomplished by sonication in an organic solvent. Another method is exfoliation by oxidation of graphite into graphene oxide. This latter method, known as the modified Hummer's method, is widely used and quite effective in generating a suspension of single sheet graphene oxide.

Graphene is hydrophobic and disperses in nonpolar solvents, whereas graphene oxide is hydrophilic and disperses in aqueous or polar solvents. The degree of hydrophobicity depends on the extent of oxidation, which is one variable that can be tuned to match the hydrophobicity of the elastomer and the graphene/graphene oxide sheets so that a solvent can be found that either forms a stable, homogeneous suspension of both components or a stable suspension of one component in a solution of another. Either way, a homogeneous suspension facilitates preparation of a homogeneous composite paper.

Whereas graphene sheets are conducting, graphene oxide sheets need to be reduced (to form reduced graphene oxide) to regain electrical conductivity. Because of the presence of elastomeric nanoparticles, mild reduction procedures will be required. Well-established methods that can be used include chemical reduction using hydrazine or ascorbic acid for reduction in solution, or photolysis for reduction of a solid. They can be applied in combination also. These methods require temperatures lower than 200° C.

The degree of cross-linking of graphene oxide sheets by covalent bonds affects the rigidity of the composite, and this can be controlled by the amount of cross-linking agent introduced. Upon reduction, cross-linked reduced graphene oxide sheets are formed. This, together with the properties of the elastomer nanoparticles, can be used to optimize the compression behavior of the composite. It has been shown that cross-linked reduced graphene oxide can form electrodes of high capacitance, up to 370 F g$^{-1}$.[2] Another property that can be varied is type and density of defects of graphene. It has been shown that nitrogen-doping and introduction of holey defects increase the capacitance.[3]

In order for the electrically conducting matrix to accommodate compression without degradation, the graphene sheets may be aligned horizontally—perpendicular to the direction of compression as shown in FIG. 10. This is because the graphene sheets will displace from each other during compression, and the horizontal alignment can accommodate this by sliding the sheets over each other, similar to the movement when graphite is used as a lubricant. Because of the very large aspect ratio of graphene sheets, the sheets align readily during filtration to form self-supporting papers.[4,5] It has been found that this self-alignment is unaffected by the presence of up to ~70 wt. % Si nanoparticles in the suspension, and self-supporting papers of Si-graphene composites suitable for use as battery electrodes can be formed by filtration.[4,6] In addition to filtration, these composites can be aligned also readily under shearing stress, such as with tape casting. Thus, composite electrodes can be formed in the desired form of a porous paper without difficulties from a suspension of elastomer nanoparticles and graphene or graphene oxide sheets.

This embodiment also comprises elastomeric nanoparticles embedded between the graphene sheets. These particles should be of the size that fits the natural pore-size distribution of stacked graphene sheets, typically ranging from 20-500 nm. The optimal size distribution will depend on the processing conditions selected to form the composite paper, the relative quantities of the components, and the dimension of the graphene sheets.

These elastomeric nanoparticles are designed to perform two functions: block the graphene surface from exposure to the electrolyte when the electrode is compressed and to restore the shape of the electrode and recover the electrode-electrolyte interfacial area after the compressive force is removed. It is essential that the elastomer can perform these functions with a minimal amount of energy, since energy consumed to deform the elastomer will not be converted to electricity. This can be seen from the equation that describes the distribution of energy from compression: $E_{comp}=E_{\Delta V}+E_{eldf}+E_{loss}$.

During compression, the energy consumed to compress the supercapacitor $E_{comp}$ is the energy input to the system. This energy is used to increase the voltage of the stored and delivered charges in the supercapacitor $E_{\Delta V}$ which is the useful energy, to deform the elastomer and other components in the supercapacitor $E_{eldf}$ and to compensate for other losses such as losses due to overvoltage and internal resistances $E_{loss}$. Thus, loss due to elastic deformation of the elastomer should be minimized.

With these considerations and in general terms, the desirable elastomers are those that are soft, easily deformable, but highly elastic, such that they can be deformed extensively, yet can still recover readily. They are very resilient and able to go through multiple cycles of compression and relaxation without degradation. In more technical terms, these properties include: 1) a high Poisson's ratio, desirably as close to 0.5 as possible. High bulk modulus so that its volume does not decrease upon compression (incompressible); 2) generally low compressive stress and low shape factors to minimize energy consumed to deform the elastomeric particles; 3) low shear modulus for easy deformation; 4) low compression set value so that the nanoparticle can be cycled many times without losing its function; and 5) good rebound resilience.

Examples of elastomers that satisfy a sufficient number of the identified criteria listed above are polyisoprene, polysiloxane, and polyurethane. The methods to prepare these elastomers and the variables that affect their particle sizes and elasticity are outlined below.

Homogeneous dispersion of elastomer nanoparticles in the graphene matrix is desirable for good capacitor performance. Two different strategies can be used to accomplish this. The first strategy is to synthesize nanoparticles of elastomer separately and then disperse them into a suspension together with graphene or graphene oxide depending on the suspension medium. This strategy has been used successfully to form graphene-Si nanoparticle composites.[4,6] Such a suspension forms composite papers upon filtering or tape casting in which the graphene or graphene oxide sheets self-align along the direction of the paper. The paper is mechanically strong and can be physically manipulated with tools. A variation to this method is to introduce a solution of elastomer into a suspension of graphene or graphene oxide sheets followed solvent removal to form the composite. This has been used successfully to form nanoparticle $Li_2S$/reduced graphene oxide composites suitable for use in batteries.[7] The second strategy is to grow the elastomer nanoparticles directly on the graphene oxide sheets by first covalently bonding a monomer onto the surface. Graphene oxide surfaces are known to be populated with oxygen-containing functional groups that can be used for anchoring other groups.

For the first strategy, the elastomer nanoparticles are prepared using a nano-emulsification process or its variation. In this process, a surfactant and a co-surfactant are used to stabilize an emulsion of two immiscible phases, typically an aqueous and an organic phase. The size of the micelle in the emulsion is determined by the concentration of surfactant, the ratio of the two phases, and the shear rate used to generate it (e.g. sonication rate). For the present purpose, the phase in which the monomers are present will be the minority phase that form nanometer to micron-size droplets suspended in the continuous phase. Since the polymerization reaction is confined primarily within the droplet, the droplet size and the concentration of monomer in it will determine the size of the polymer particle formed. Since it is possible to vary the monomer concentration from a dilute solution to neat monomers, nanoparticles of a range of sizes can be prepared. This method is used to prepare nanoparticles of polyisoprene and polyurethane.

Uniform nanoparticles of polyisoprene have been successfully prepared by radical polymerization using the nano-emulsion technique.[8] Polyurethane is synthesized by adding long chain alkanediols to diisocyanate. There are reports of formation of uniform nanoparticles of polyurethane of dimensions ranging from 200 nm,[9] to as small as 20 nm,[10] indicating that significant control of particle size by tuning synthesis parameters is possible with the nano-emulsion technique.

A similar principle can be used to form polysiloxane nanoparticles, which can be synthesized by base-catalyzed condensation of alkoxysilane in the presence of a surfactant.[16] It has been shown that particles of a rather uniform size of 20 nm or larger can be prepared.

The second strategy is to utilize the hydroxyl and epoxy functional groups on graphene oxide to grow a portion of the polymer molecules directly on the sheets. Anchoring the polymer with covalent bonds can improve the direct contact of a polymer particle with the graphene surface. The polymer growth on the graphene oxide surface can be accomplished using the reactions shown in FIGS. 11A-11B for polyurethane and polysiloxane. For polyurethane, the surface hydroxyl groups may be utilized to anchor the polymer chain. By first reacting a graphene oxide sheet with diisocyanate, a monomeric unit can be anchored on the surface. This modified graphene oxide participates in the polymerization reaction when placed in a solution containing the diol and diisocyanate monomers. Polymeric nanoparticles may be formed with some of them anchored on the surface and some in solution.

For polysiloxane, the high reactivity of the epoxy groups with aminosilane may be used to anchor siloxy groups on the graphene oxide surface. The anchored siloxy groups function as a monomer and participate in condensation chain growth reaction after hydrolysis.

The material property of a polymer is not only related to its constituent monomeric components but also strongly influenced by the degree of cross-linking. Whereas bifunctional monomers lead to linear elastomers, trifunctional monomers cross-link the chains. Thus, by varying the amount and time of addition of the trifunctional monomers, the elasticity of the polymers is tuned. In the siloxane polymer, trialkoxysilane may be used as the cross-linking agent to modify the elastic property, whereas for polyurethane, the ratio of triol to diol controls the degree of cross linking. In the isoprene polymer, each monomeric unit retains a reactive double bond during polymerization, and these bonds can be used for cross-linking by the addition of sulfur (vulcanization). The degree of vulcanization will impact on the polymer properties. In the case of polyurethane, there are additional handles to tune the elastic properties, which include use of diols of different chain lengths, or cyclic, aromatic, or aliphatic diisocyanates.

Evaluation and Characterization of the Composite Material.

The properties of particular interest here are: the compressive stress-strain relationship, the rebound properties, cycling resilience, capacitance, and conductivity. These are optimized as a function of composite composition (elastomer to graphene ratio and type of elastomer), average size of elastomer nanoparticles, elastomer molecular weight, extent of cross-linking, oxygen content of graphene, and presence and nature of defects on graphene.

Figure 12A:
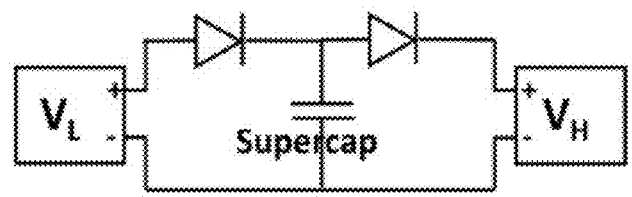
FIG. 12A shows a circuit for storing electricity generated by the deformation of a supercapacitor. Two rechargeable batteries are used with a higher $V_H$ and a lower operating voltage, $V_L$. The two rectifiers permit currents flowing in the directions indicated.
Figure 12B:
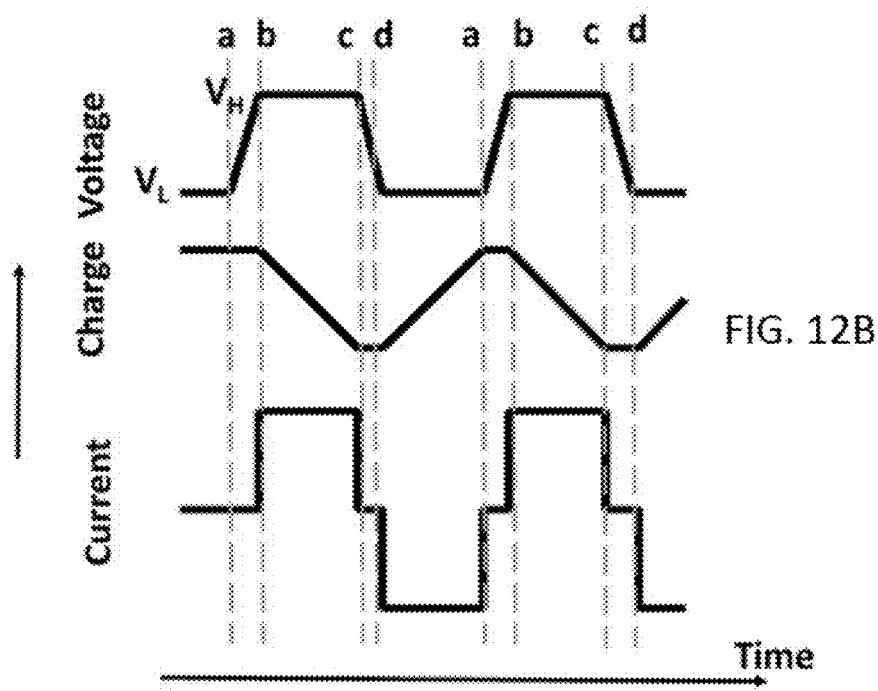
FIG. 12B shows the changes in the voltage (top), accumulated charge (middle), and current to and from the supercapacitor (bottom) during cycling. At point a, compression begins. At point b, the voltage reaches $V_H$ and current begins to flow between the supercapacitor and the high voltage battery, depleting the accumulated charges. At point c, the compression force is removed and the system begins to relax. The voltage drops until it reaches $V_L$, when current begins to flow between the low voltage battery and the supercapacitor.
Figure 12C:
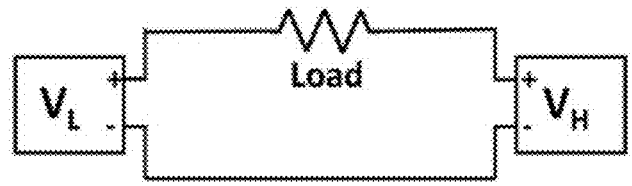
FIG. 12C shows the circuit for discharging the stored electricity.

A property of interest is the energy conversion efficiency. The efficiency is determined using a circuit that stores the converted energy in a battery as shown in FIGS. 12A-12C. There are two rechargeable batteries in the circuit that operate at different voltages, a higher $V_H$ and a lower $V_L$ (FIG. 12A). It operates in the following manner. If a compressible electrode is used whose capacitance decreases with compression and compression begins when the voltage of the supercapacitor is at $V_L$ (point a in FIG. 12B), no charges can flow into or out of the supercapacitor. Its cumulated charge Q remains unchanged, and its voltage increases as the capacitance decreases according to the equation: CV=Q. When the voltage reaches $V_H$ (point b), current begins to flow from the supercapacitor to the high-voltage battery. Further compression causes more charges to leave the supercapacitor for the battery, and the battery is charged. These changes in the voltage and current flow are shown in FIG. 12B which are drawn neglecting the response time constant of the capacitor or the circuit. At the end of compression, the supercapacitor begins to relax (point c). Its capacitance begins to increase. Since no charges can flow to the supercapacitor from either battery, the increased capacitance results in a decrease in voltage. This continues until its voltage drops to $V_L$, when current begins to flow from the low-voltage battery to the supercapacitor (point d). The voltage remains close to but below $V_L$ due to the current flow as relaxation continues, and the charge stored in the supercapacitor is repopulated until the next compression cycle begins. Thus, the net effect of the compression-relaxation cycle is to transfer charges from the low-voltage battery to the high-voltage battery, and the energy of compression is stored in the form of a charged high-voltage battery.

REFERENCES FOR EXAMPLE 2

1. Geim, A. K.; Novoselov, K. S., The rise of graphene. *Nature Materials* 2007, 6, 183-191.
2. Cui, Y.; Cheng, Q.-Y.; Wu, H.; Wei, Z.; Han, B.-H., Graphene oxide-based benzimidazole-crosslinked networks for high-performance supercapacitors. *Nanoscale* 2013, 5, (18), 8367-8374.
3. Luo, G.; Liu, L.; Zhang, J.; Li, G.; Wang, B.; Zhao, J., Hole Defects and Nitrogen Doping in Graphene: Implication for Supercapacitor Applications. *ACS Applied Materials & Interfaces* 2013, 5, (21), 11184-11193.
4. Lee, J. K.; Smith, K. B.; Hayner, C. M.; Kung, H. H., Silicon nanoparticles-graphene paper composites for Li ion battery anodes. *Chemical Communications* (Cambridge, United Kingdom) 2010, 46, (12), 2025-2027.
5. Lin, X.; Shen, X.; Zheng, Q.; Yousefi, N.; Ye, L.; Mai, Y.-W.; Kim, J.-K., Fabrication of highly-aligned, conductive, and strong graphene papers using ultralarge graphene oxide sheets. *ACS Nano* 2012, 6, (12), 10708-10719.
6. Zhao, X.; Hayner, C. M.; Kung, M. C.; Kung, H. H., In-plane vacancy-enabled high-power Si-graphene composite electrode for lithium-ion batteries. *Advanced Energy Materials* 2011, 1, (6), 1079-1084.
7. Han, K.; Shen, J.; Hayner, C. M.; Ye, H.; Kung, M. C.; Kung, H. H., Li2S-reduced graphene oxide nanocomposites as cathode material for lithium sulfur batteries. *Journal of Power Sources* 2014, 251, 331-337.
8. Landfester, K., Miniemulsion Polymerization and the Structure of Polymer and Hybrid Nanoparticles. *Angew. Chem. Int. Ed.* 2009, 48, 4488-4507.
9. Tiarks, F.; Landfester, K.; Antonietti, M., One-step preparation of polyurethane dispersions by miniemulsion polyaddition. *Journal of Polymer Science Part A: Polymer Chemistry* 2001, 39, (14), 2520-2524.
10. Morral-Ruiz, G.; Solans, C.; Garcia, M. L.; Garcia-Celma, M. J., Formation of Pegylated Polyurethane and Lysine-Coated Polyurea Nanoparticles Obtained from 0/W Nano-emulsions. *Langmuir* 2012, 28, 6256-6264.

Example 3: Reduced Graphene Oxide Hydrogel Embedded Polyurethane Composite as Elastomeric Supercapacitor Electrode Materials Introduction A porous 3D graphene hydrogel composite embedded with particles of additional active materials, graphite and $MnO_2$, was successfully synthesized using a solution-based self-assembly process. To prevent agglomeration of hydrophobic graphite and $MnO_2$ particles during the solution-based synthesis process, particles of active materials were wrapped with hydrophilic graphene oxide (GO) platelets through a solution-based processing. This was achieved by spray drying an aqueous suspension of active materials and GO, which resulted in composite particles, consisting of crumpled GO sheets and embedded particles of active materials. The reduced graphene oxide-based hydrogel electrode was then synthesized through hydrothermal reduction process using the aforementioned spray-dried particles. An open pore polyurethane foam was used as the supporting matrix to enhance the mechanical stability of the composite hydrogel electrode. The GO-assisted spray-drying process stabilized the hydrophobic particles of active materials, resulting in an even distribution of active materials throughout the entire hydrogel structure. The increase in electrical conductivity and electrochemical performance of such composite electrodes were demonstrated in a two-electrode electric double layer capacitor setup.

EXPERIMENTAL

Preparation of Spray-Dried GO Wrapped Powder

Nanoparticles of graphite and $MnO_2$ were obtained from US Nano Research. An aqueous suspension of 0.5 wt. % graphene oxide (GO) was prepared using the modified Hummer's method as described previously[26], starting with flake graphite (Asbury Carbons, 230U Grade, High Carbon Natural Graphite 99+).

0.6 g of polyvinylpyrrolidone (PVP) (Sigma Aldrich) was added to 120 ml of ethanol (200 proof, Fisher Scientific), which was then sonicated for 10 minutes to ensure the solid was completely dissolved. 1.6 g of either graphite or $MnO_2$ powder was then added to the prepared ethanol-PVP solution. The suspension was then sonicated for an additional 30 minutes to break up any agglomeration of the as-received powder. The suspended ethanol mixture containing PVP and active materials of either graphite or $MnO_2$ was then mixed with 160 ml of 0.5 wt. % GO suspension. The resulting mixture was then stirred on the stir-plate until it was ready for spray drying.

Figure 13:
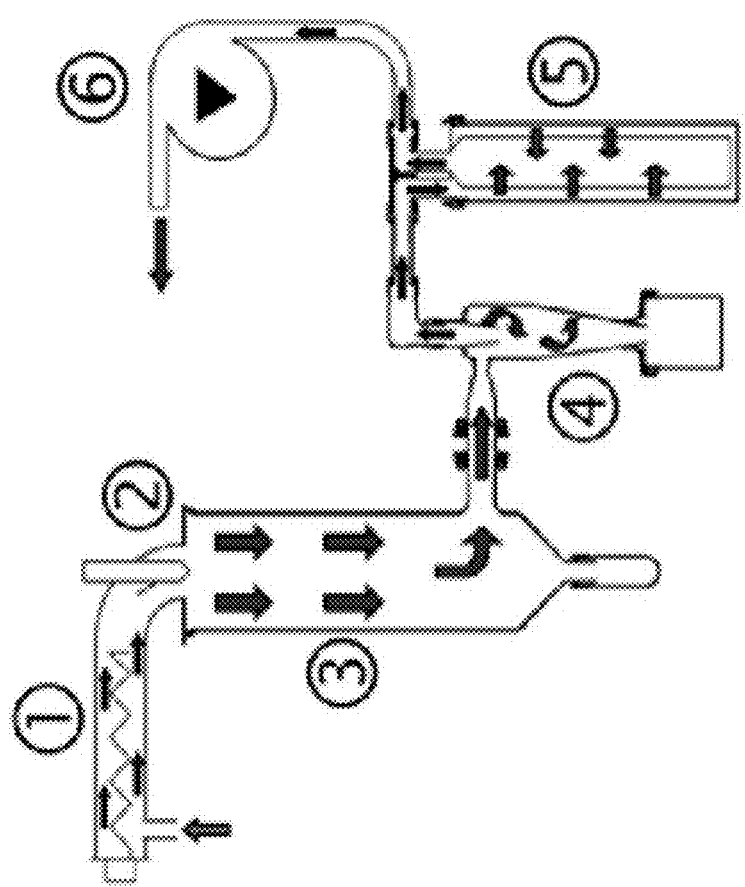
FIG. 13 is a diagram showing the functional principle of a Buchi Mini Spray Dryer B-290. The diagram was obtained from a Technical Data Sheet publicly available from www-.buchi.com. The functional principle is described in 6 steps as follows: Step 1—Heating: Heat the inlet air to the desired temperature (max 220° C.); Step 2—Droplet formation: Two-fluid nozzle; Step 3—Drying chamber: Conductive heat exchange between drying gas and sample droplets; Step 4—Particle collection: Cyclone technology; Step 5—Outlet filter: Collection of finest particles to protect the user and the environment; and Step 6—Drying gas: Delivered by aspirator.

A Buchi Mini Spray Dryer B-290 was used for the following process. (See the schematic illustration in FIG. 13.) The standard nozzle tip diameter of 0.7 mm was used; the inlet and outlet were set to 120° C. and 90° C., respectively. The previously prepared suspension containing GO, PVP, and active materials (graphite or $MnO_2$) was then fed through the system using the built-in suction pump, while being stirred to prevent phase separation of the suspension. The resulting powder, containing either graphite (GO-G) or $MnO_2$ (GO-Mn) was captured by the cyclone particle collector and was then collected and stored in air-tight container for future use.

Preparation of PU-rGOH Composite Electrode

Similar to Example 1, above, pieces of polyurethane (PU) foam, 2.5×2.5×2.5 cm³, were cut from larger stock pieces, Type TC-266(50/100), obtained from BJB Enterprises (Tustin, Calif.). The pieces were gently washed with a mixture of DDI water and ethanol and then vacuum dried overnight to remove any remaining moisture.

40 ml 0.75 wt. % GO suspension was obtained from the original 0.5 wt. % suspension through further centrifugation. 600 mg of L-ascorbic acid (Sigma Aldrich) was then added to the GO suspension and stirred for 30 minutes. 1.2 g of either GO-G or GO-Mn powder was added to 40 ml of ethanol and stirred for 30 minutes as well. The two suspensions, one with GO and L-ascorbic acid and the other with spray-dried powder, were then mixed together and stirred for an additional 30 minutes. The pre-cut PU piece was then completely submerged into the mixed suspension and fully compressed multiple times to remove any trapped air bubbles within the porous structure of the PU foam piece and to ensure complete infiltration of the prepared mixture. The mixture, along with the submerged PU piece, was then sealed in air-tight glass vial and heated in oil bath at 80° C. for 24 hours. The resulting PU-rGOH composites were then removed and washed in DDI water for 24 hours to remove any excess L-ascorbic acid. The samples were then vacuum dried overnight to remove the remaining moisture. The graphite-containing sample was labeled as G-PGH, and the MnO$_2$-containing sample was labeled as Mn-PGH.

Sample Characterization and Measurements

Scanning electron microscopy images were collected with a high-resolution field emission scanning electron microscope (FESEM, Hitachi SU8030). X-ray photoelectron spectroscopy (XPS) was performed using a Thermo Scientific ESCALAB 250Xi (Al Kα, 1486.6 eV).

The stress-strain relationships were determined with a mechanical tester (MTS Sintech 20G), using a compression and rebound speed of 5 mm s$^{-1}$.

For electrical resistance measurements, aluminum foils serving as electrical contacts (Alfa Aesar, 0.025 mm, 99.99%) were pasted with silver conducting paste onto two opposing faces of a PU-rGO foam piece to improve electrical contact. A voltage ramp from 0 to 3 V was applied across the current collectors using a potentiostat/galvanostat system (Arbin Instruments BT2000), which recorded the current passing through the foam piece.

Electrochemical tests of a foam piece were carried out in a three-electrode setup, with the PU-rGO composite as the working electrode, Ag/AgCl (CH Instruments) as the reference electrode, and Pt foil (Alfa Aesar, 0.025 mm, 99.9%) as the counter electrode. An aqueous solution of K$_2$SO$_4$ (0.5 M, Sigma Aldrich, 99% ACS) was the electrolyte. Using an electrochemical workstation (Autolab PGSTAT128N), current at densities of 0.05 A/g, 0.1 A/g, and 0.5 A/g, based on the weight of the active materials in the foam pieces, was applied to charge and discharge the sample over a voltage range of −0.2 to 0.6 V. Electrochemical impedance spectrometry was performed using the same Autolab workstation.

Results and Discussion

Figure 14:
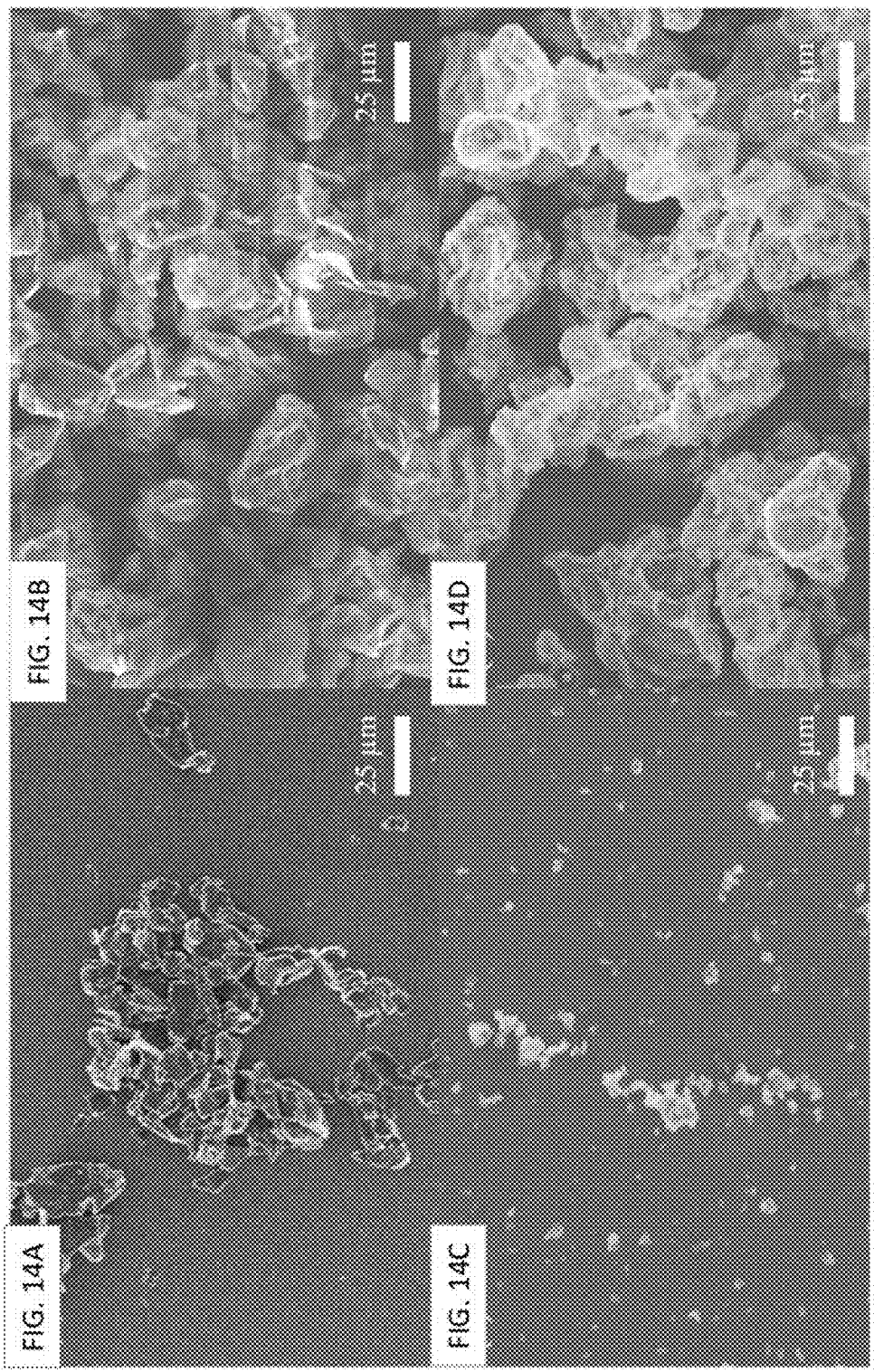
FIG. 14A-FIG. 14D show SEM images of (FIG. 14A) as-received graphite particles after sonication, (FIG. 14B) spray-dried graphene oxide wrapped graphite particles, (FIG. 14C) as-received $MnO_2$ particles after sonication, and (FIG. 14D) spray-dried graphene oxide wrapped $MnO_2$ particles. Scale bar is 25 µm.

The as-received graphite and MnO$_2$ particles were observed to have diameters ranging from 5-10 μm and <1 μm, respectively, after sonication in ethanol solution, as shown in FIG. 14A and FIG. 14C. A piece of Si wafer was dip coated with the suspension containing the particles. After drying, the Si wafer was then observed under SEM. As a result, slight agglomeration of both the graphite and MnO$_2$ were observed (FIG. 14A and FIG. 14C). This was due to the surface tension of the ethanol pulling the micro/nanoparticles together upon drying on the Si wafer. After spray drying with GO suspension, both the graphite and MnO$_2$ were evenly wrapped with GO sheets (FIG. 14B and FIG. 14D). The diameter of both types of spray-dried GO powders was approximately 10-30 μm in diameter.

Figure 15:
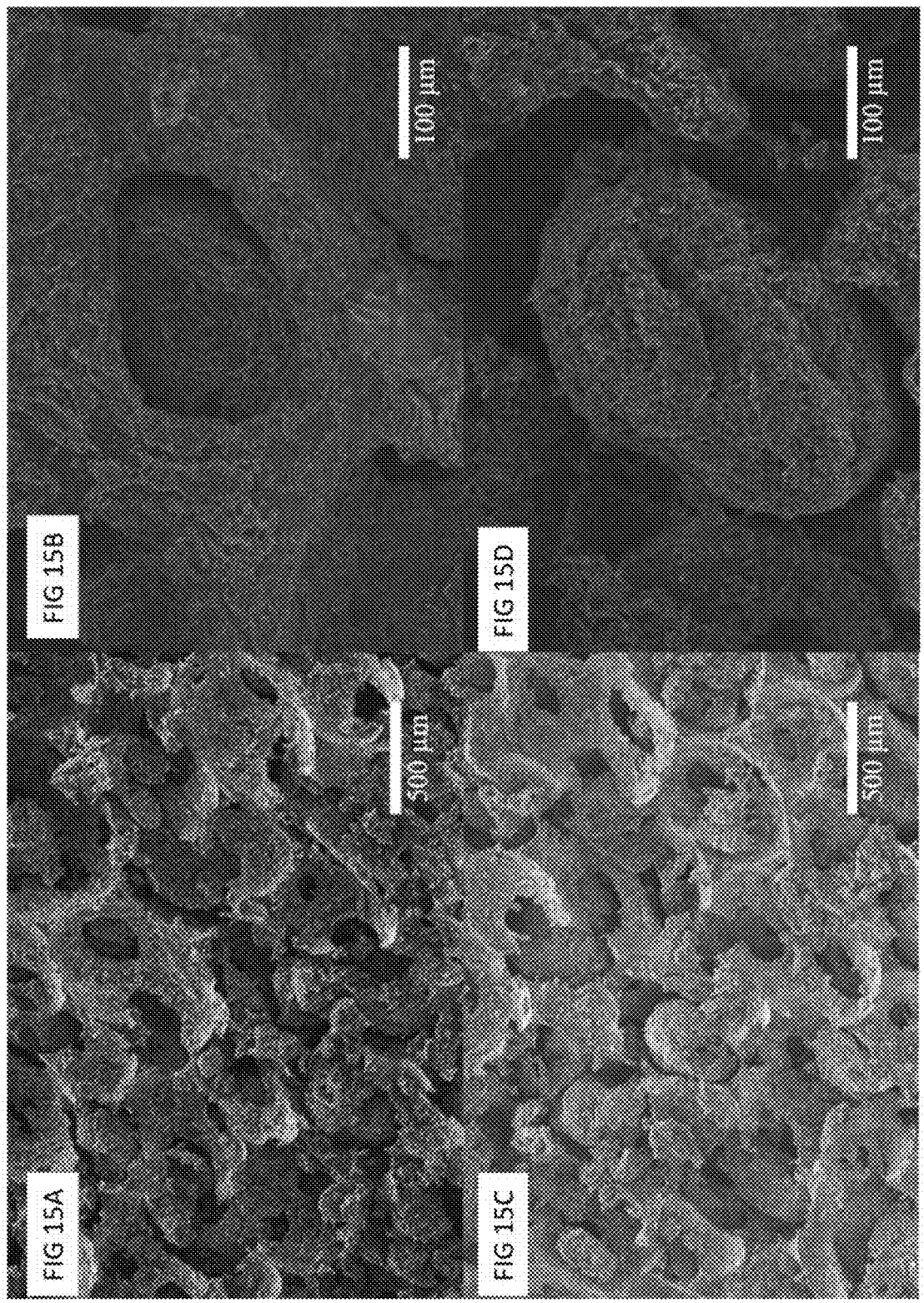
FIG. 15A-FIG. 15D show SEM images of G-PGH under (FIG. 15A) 35× and (FIG. 15B) 350× magnifications and Mn-PGH under (FIG. 15C) 35× and (FIG. 15D) 350× magnifications. Corresponding scale bars are shown within each image.
Figure 16:
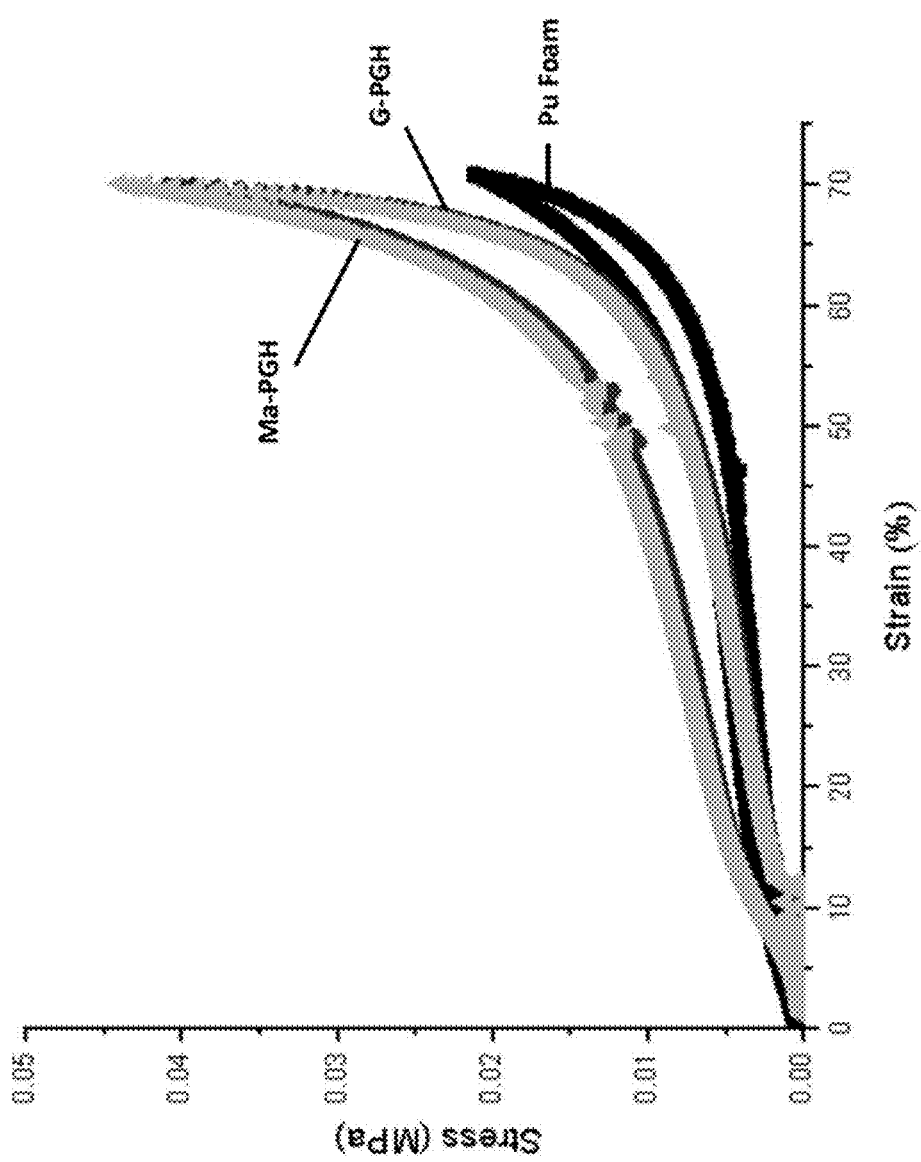
FIG. 16 shows the stress-strain measurement of as-received PU foam, G-PGH, and Mn-PGH samples.

As described in Example 1, the PU has an open pore structure with an average pore diameter around 500 μm, allowing suspension of GO-G and GO-Mn to infiltrate the PU structure and form rGOH upon hydrothermal reduction. The resulting samples show not only rGOH forming within open pores of the PU substrate (FIG. 15A and FIG. 15C), but also the surface of the PU substrate itself was coated with layers of reduced graphene oxide sheets (FIG. 15B and FIG. 15D). Similar to Example 1, the G-PGH and Mn-PGH samples remained highly flexible. A slight increase in the elastic modulus of the G-PGH and Mn-PGH was observed, due to the additional graphene hydrogel phase within the open pores of the PU supporting matrix. However, the addition of rGOH structure within the pores of the PU substrate did not significantly affect the mechanical properties of the original PU substrate. Structural deformation of the composites under compression was identical to the results reported in Example 1, which can be described adequately with the classical model for open-cell foams [111].

Figure 17E:
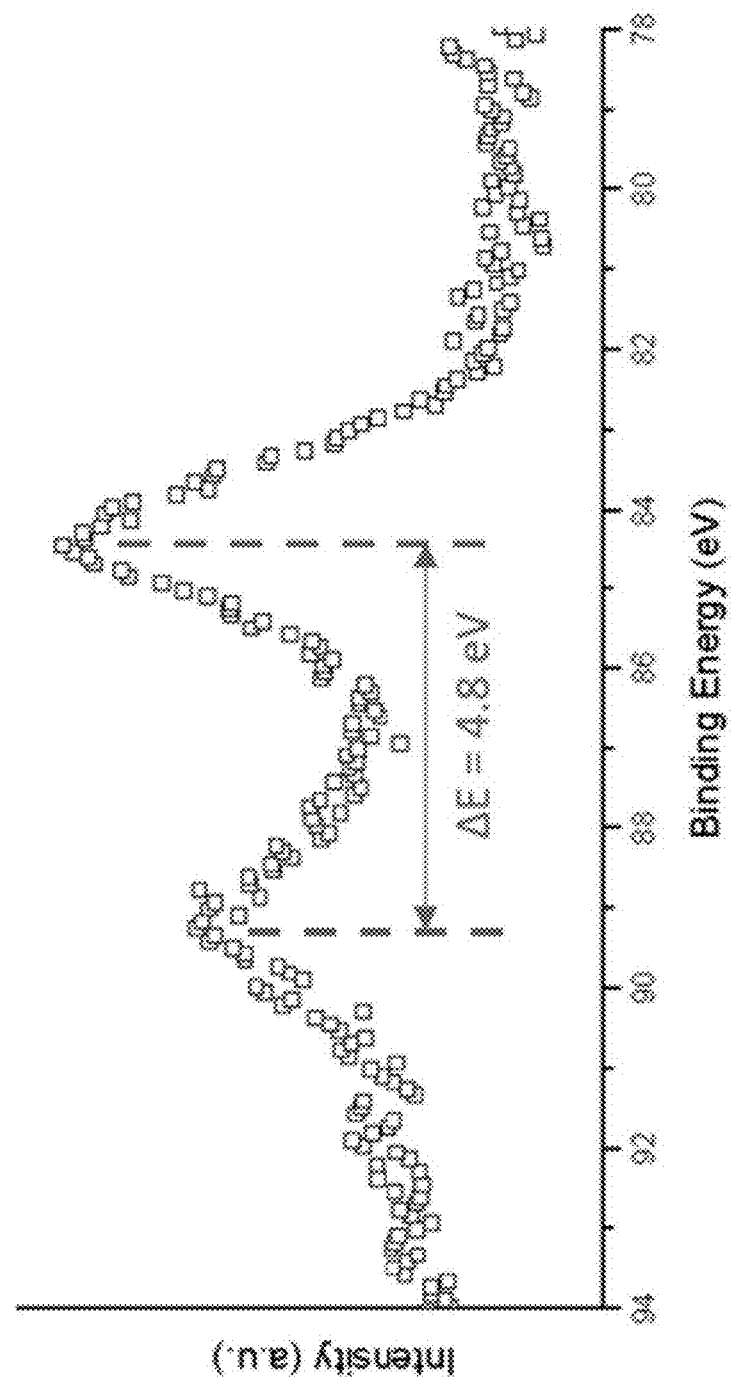

For the XPS spectrum shown in FIG. 17A-FIG. 17E, flakes of rGOH were removed from G-PGH and Mn-PGH samples using copper backed double sided tape and then characterized with XPS. The C 1s spectra of the G-PGH sample showed a higher intensity C—C peak, due to the embedded graphite particles (FIG. 17A). For the Mn-PGH sample, its O 1s peak (FIG. 17D) was entirely composed of organic C—O and C═O peaks at ~531.5 eV and ~533 eV, respectively, with no detectable metallic Mn—O peak at ~529 eV[112]. The C:O ratio of Mn-PGH was 6.5:1, indicating that the hydrothermal reduction of the GO phase of the composite was successful. The Mn 3s spectra (FIG. 17E) showed two distinct peaks at ~84.4 eV and ~89.3 eV. The ΔE of the two peaks was approximately 4.9 eV, showing that the oxidation state was Mn4+[113].

Figure 18:
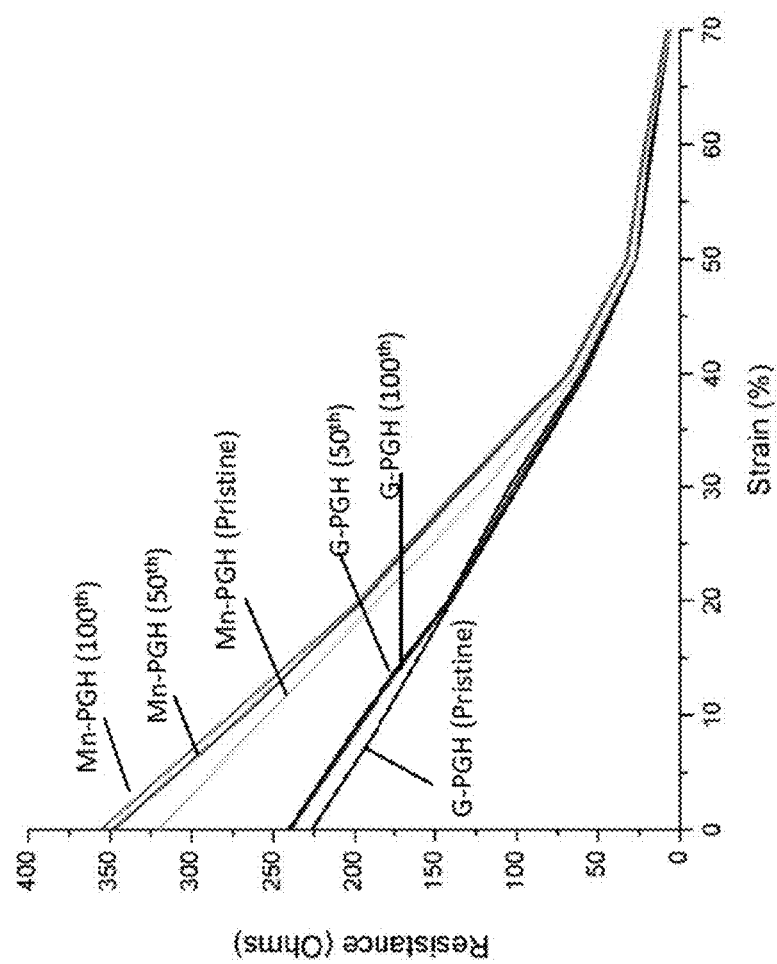
FIG. 18 shows the resistance of G-PGH and Mn-PGH electrode samples under compressive strain of 0 to 70% and after 0, 50, and 100 repeated cycles of 70% compression.

Both the G-PGH and Mn-PGH samples were compressed to 70% for up to 100 cycles. Resistance of the samples was measured after 0, 50, and 100 cycles (FIG. 18). Both samples showed minimal degradation to electrical conductivity. The G-PGH showed slightly lower resistance due to its higher conductive carbon content relative to the Mn-PGH. Both samples showed a linear trend in reduction of resistance as higher compressive strain was applied to the samples, up to 50% strain. After that point, the resistance value for both samples plateaued. This can be explained through the deformation mechanism of the PU substrate upon compression. When uncompressed, the rGOH particles within the open pores of the PU substrate were free standing, as shown in FIG. 15A-DD. Since the rGOH particles were separated by the wall of the porous PU substrate, they did not contribute significantly to the electrical conductivity of the sample. As the sample underwent compression, an increasing number of rGOH particles came in contact with each other as the open pores of the PU substrate collapsed (see FIG. 18). At strain higher than 50%, most of the pores of the PU substrate collapsed, allowing a majority of the rGOH particles to be in physical contact with each other and allowing electricity to pass through and form a large number of conductive pathways within the sample. With a majority of the rGOH particles already electrically conductive, increasing the strain to 50% and above therefore did not further lower the resistance by much.

Figure 19A:
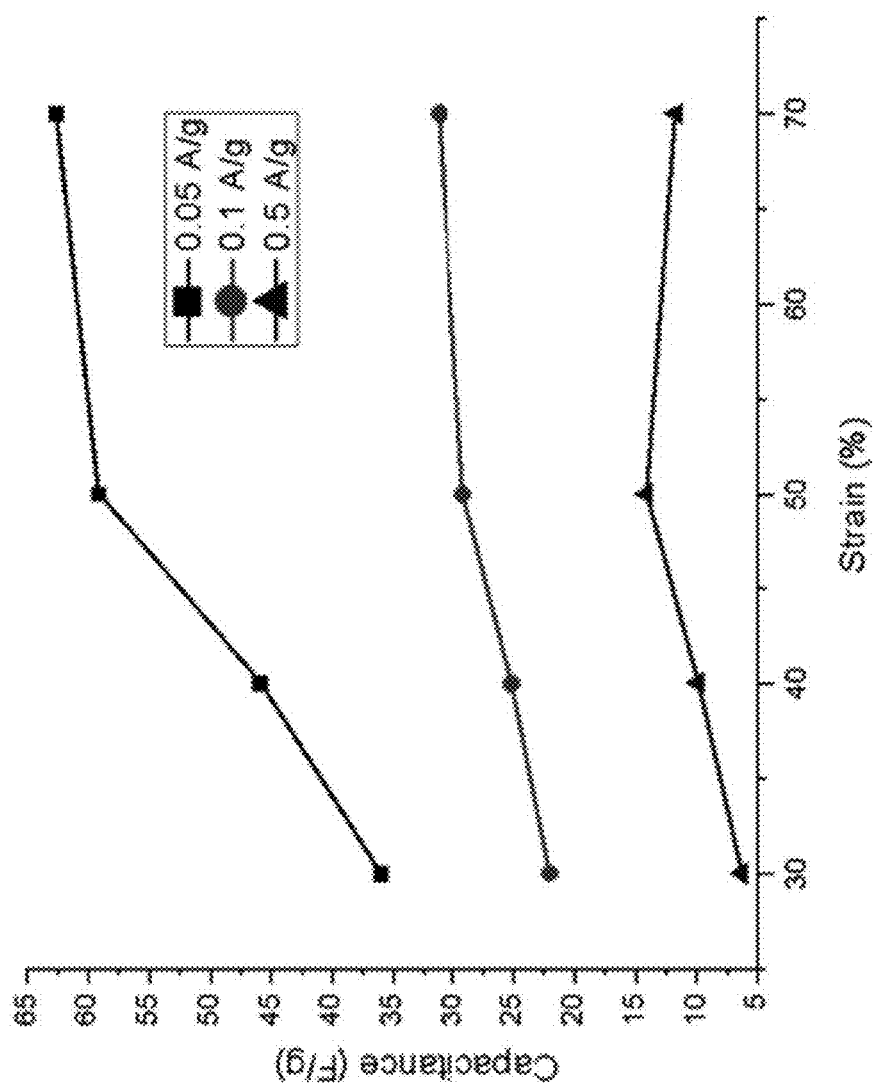
FIG. 19A-FIG. 19D show capacitances of (FIG. 19A) GO-G and (FIG. 19B) GO-Mn samples under 0.05 A $g^{-1}$, 0.1 A $g^{-1}$, and 0.5 A $g^{-1}$ and under compressive strain of 30%, 40%, 50%, and 70%. Also shown is the EIS spectrum of (FIG. 19C) GO-G and (FIG. 19D) GO-Mn samples under compressive strain of 30%, 40%, 50%, and 70%.
Figure 19B:
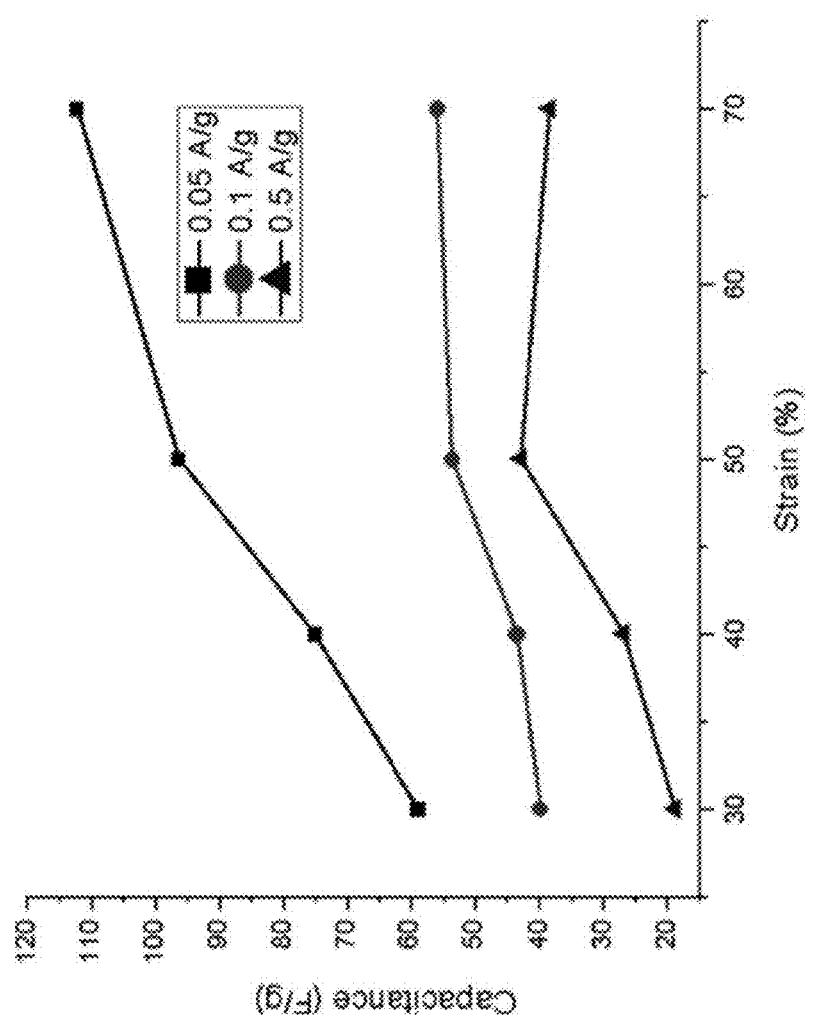
Figure 19C:
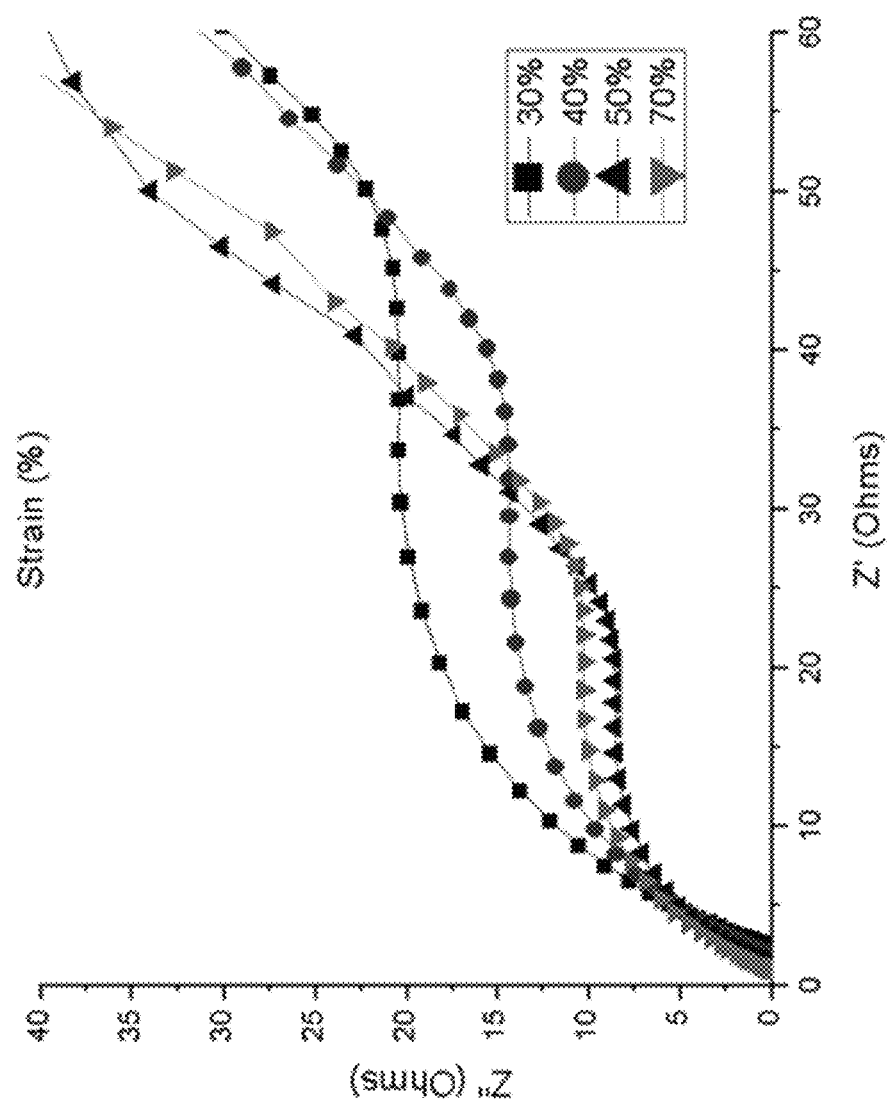
Figure 19D:
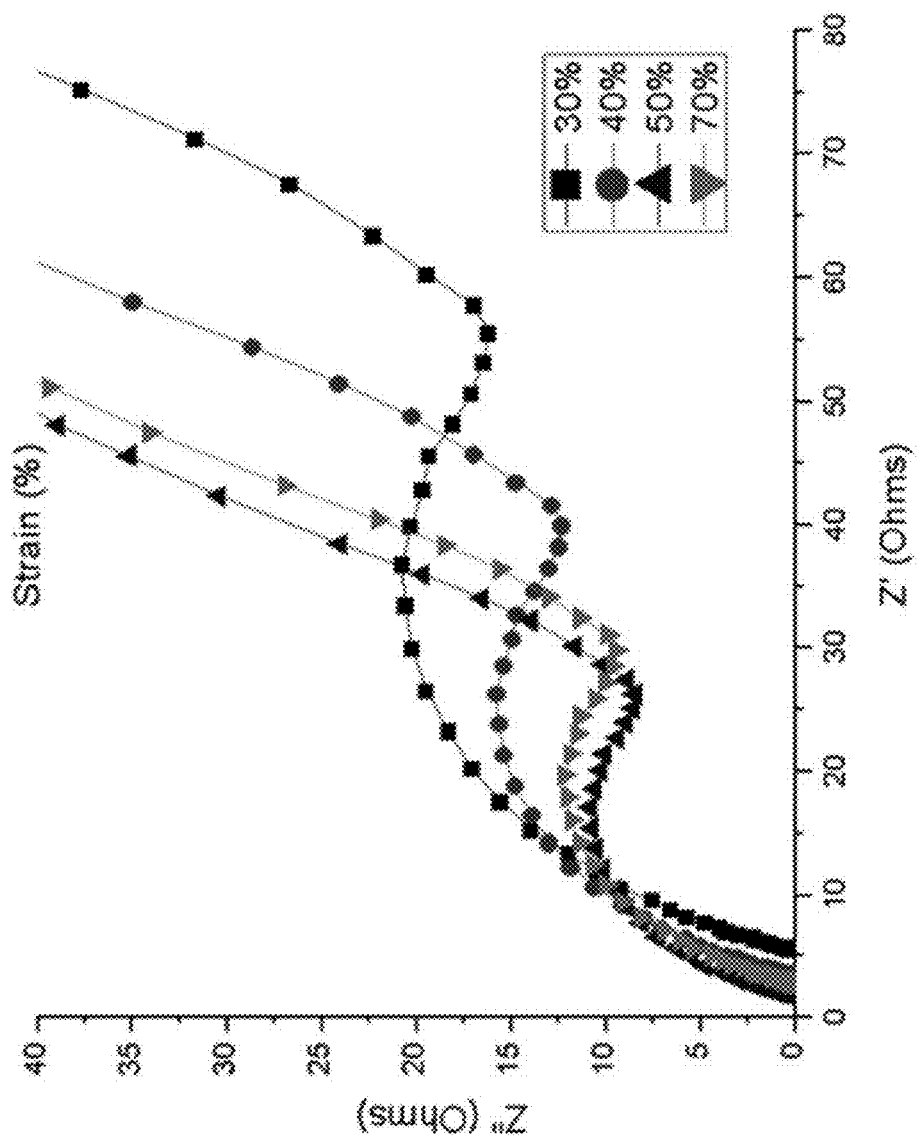

The capacitance and impedance of the G-PGH and Mn-PGH samples were measured as a function of the applied compressive strain (FIG. 19A-FIG. 19D). At low current density of 0.05 A g$^{-1}$, the capacitance for both samples increased as the compressive strain was increased. The embedded MnO$_2$ particles within the Mn-PGH samples exhibited higher capacitance due to the pseudocapacitance. However, the capacitance plateaued under 0.1 A g$^{-1}$ and decreased under 0.5 A g$^{-1}$ at strain above 50% for both samples. This was again due to the deformation mechanism of the PU substrate, as strain higher than 50% closes the previously open pores with the porous PU substrate. At higher current densities, the required fast ion transport can no longer infiltrate the collapsed pores of the PU substrate, which reduces the electrochemical performance of rGOH and its embedded active materials of graphite or MnO$_2$. The EIS spectrum showed similar trends. At compressive strain between 30 to 50%, the charge transfer resistance of the test cells was reduced as the strain was increased, with a slight reduction in series resistance observed as well. At 70% compressive strain, the charge transfer resistance increased from the measurement taken at 50%, as indicated by the larger semi-circle of the EIS plot (FIG. 19A and FIG. 19D).

CONCLUSION

A mechanical spray drying process was successfully implemented to wrap the hydrophobic exterior of graphite and $MnO_2$ particles with hydrophilic GO sheets. The resulting powder was then added to a GO suspension and the combined suspension underwent chemically assisted (L-ascorbic acid) hydrothermal reduction to form rGO hydrogel. By filling the porous PU substrate with these suspended mixtures, composite electrode materials could be formed, which retained the highly flexible mechanical properties of the pristine PU substrate. The conductivity and the electrochemical performance improved two to three times compared to that of the PUrGO composite reported in Example 1, above.

REFERENCES FOR EXAMPLE 3

1. Kim, Y. A., et al., *Important roles of graphene edges in carbon-based energy storage devices*. Journal of Energy Chemistry, 2013. 22(2): p. 183-194.
2. Brodie, B. C., *XIII. On the atomic weight of graphite*. Philosophical Transactions of the Royal Society of London, 1859. 149: p. 249-259.
3. Yu, A. P., et al., *Graphite nanoplatelet-epoxy composite thermal interface materials*. Journal of Physical Chemistry C, 2007. 111(21): p. 7565-7569.
4. Shang, N. G., et al., *Catalyst-Free Efficient Growth, Orientation and Biosensing Properties of Multilayer Graphene Nanoflake Films with Sharp Edge Planes*. Advanced Functional Materials, 2008. 18(21): p. 3506-3514.
5. Novoselov, K. S., et al., *Electric field effect in atomically thin carbon films*. Science, 2004. 306(5696): p. 666-669.
6. Jiao, L. Y., et al., *Narrow graphene nanoribbons from carbon nanotubes*. Nature, 2009. 458(7240): p. 877-880.
7. Liu, N., et al., *One-step ionic-liquid-assisted electrochemical synthesis of ionic-liquid-functionalized graphene sheets directly from graphite*. Advanced Functional Materials, 2008. 18(10): p. 1518-1525.
8. Kim, F., L. J. Cote, and J. Huang, *Graphene oxide: surface activity and two-dimensional assembly*. Adv Mater, 2010. 22(17): p. 1954-8.
9. Zhu, Y. W., et al., *Graphene and Graphene Oxide: Synthesis, Properties, and Applications*. Advanced Materials, 2010. 22(35): p. 3906-3924.
10. Park, S. and R. S. Ruoff, *Chemical methods for the production of graphemes* (vol 4, pg 217, 2009). Nature Nanotechnology, 2010. 5(4): p. 309-309.
11. Gomez-Navarro, C., et al., *Atomic Structure of Reduced Graphene Oxide*. Nano Letters, 2010. 10(4): p. 1144-1148.
12. Jang, I. Y., et al., *Exposed Edge Planes of Cup-Stacked Carbon Nanotubes for an Electrochemical Capacitor*. Journal of Physical Chemistry Letters, 2010. 1(14): p. 2099-2103.
13. Yuan, W., et al., *The edge-and basal-plane-specific electrochemistry of a single-layer graphene sheet*. Sci Rep, 2013. 3: p. 2248.
14. Sun, C. Q., S. Y. Fu, and Y. G. Nie, *Dominance of Broken Bonds and Unpaired Nonbonding pi-Electrons in the Band Gap Expansion and Edge States Generation in Graphene Nanoribbons*. Journal of Physical Chemistry C, 2008. 112(48): p. 18927-18934.
15. Xue, Y. H., et al., *Nitrogen-Doped Graphene Foams as Metal Free Counter Electrodes in High Performance Dye-Sensitized Solar Cells*. Angewandte Chemie-International Edition, 2012. 51(48): p. 12124-12127.
16. Long, Y., et al., *Oxidation of SO2 to SO3 catalyzed by graphene oxide foams*. Journal of Materials Chemistry, 2011. 21(36): p. 13934-13941.
17. Lin, Y. R., et al., *Superhydrophobic Functionalized Graphene Aerogels*. Acs Applied Materials & Interfaces, 2011. 3(7): p. 2200-2203.
18. Zhao, Y., et al., *A Versatile, Ultralight, Nitrogen-Doped Graphene Framework*. Angewandte Chemie-International Edition, 2012. 51(45): p. 11371-11375.
19. Niu, Z. Q., et al., *A Leavening Strategy to Prepare Reduced Graphene Oxide Foams*. Advanced Materials, 2012. 24(30): p. 4144-4150.
20. Qiu, L., et al., *Biomimetic superelastic graphene-based cellular monoliths*. Nature Communications, 2012. 3.
21. Worsley, M. A., et al., *Synthesis of Graphene Aerogel with High Electrical Conductivity*. Journal of the American Chemical Society, 2010. 132(40): p. 14067-14069.
22. Worsley, M. A., et al., *High Surface Area, sp(2)-Cross-Linked Three-Dimensional Graphene Monoliths*. Journal of Physical Chemistry Letters, 2011. 2(8): p. 921-925.
23. Xu, Y. X., et al., *Self-Assembled Graphene Hydrogel via a One-Step Hydrothermal Process*. Acs Nano, 2010. 4(7): p. 4324-4330.
24. Hu, H., et al., *Ultralight and Highly Compressible Graphene Aerogels*. Advanced Materials, 2013. 25(15): p. 2219-2223.
25. Wu, Z. S., et al., *Three-Dimensional Nitrogen and Boron Co-doped Graphene for High-Performance All-Solid-State Supercapacitors*. Advanced Materials, 2012. 24(37): p. 5130-5135.
26. Goodenough, J. B. and Y. Kim, *Challenges for rechargeable Li batteries*. Chemistry of Materials, 2010. 22(3): p. 587-603.
27. Dunn, B., H. Kamath, and J.-M. Tarascon, *Electrical Energy Storage for the Grid: A Battery of Choices*. Science, 2011. 334(6058): p. 928-935.
28. Li, H., et al., *Research on advanced materials for Li-ion batteries*. Advanced Materials, 2009. 21(45): p. 4593-4607.
29. Li, J., C. Daniel, and D. Wood, *Materials processing for lithium-ion batteries*. Journal of Power Sources, 2011. 196(5): p. 2452-2460.
30. Lu, L. G., et al., *A review on the key issues for lithium-ion battery management in electric vehicles*. Journal of Power Sources, 2013. 226: p. 272-288.
31. Zhang, M., et al., *One-step hydrothermal synthesis of Li2FeSiO4/C composites as lithium-ion battery cathode materials*. Journal of Materials Science, 2012. 47(5): p. 2328-2332.
32. Huang, B., X. D. Zheng, and M. Lu, *Synthesis and electrochemical properties of carbon nano-tubes modified spherical Li2FeSiO4 cathode material for lithium-ion batteries*. Journal of Alloys and Compounds, 2012. 525: p. 110-113.
33. Tarascon, J. M. and M. Armand, *Issues and challenges facing rechargeable lithium batteries*. Nature, 2001. 414 (6861): p. 359-367.
34. Kim, T., et al., *Carbon nanotubes (CNTs) as a buffer layer in silicon/CNTs composite electrodes for lithium secondary batteries*. Journal of Power Sources, 2006. 162(2 SPEC. ISS.): p. 1275-1281.

35. Ma, H., et al., *Nest-like silicon nanospheres for high-capacity lithium storage.* Advanced Materials, 2007. 19(22): p. 4067-+.
36. Kim, H. and J. Cho, *Superior lithium electroactive mesoporous Si@Carbon core-shell nanowires for lithium battery anode material.* Nano Letters, 2008. 8(11): p. 3688-3691.
37. Ma, C. L., et al., *Exfoliated graphite as a flexible and conductive support for Si-based Li-ion battery anodes.* Carbon, 2014. 72: p. 38-46.
38. Zhou, X., et al., *Self-Assembled Nanocomposite of Silicon Nanoparticles Encapsulated in Graphene through Electrostatic Attraction for Lithium Ion Batteries.* Advanced Energy Materials, 2012. 2(9): p. 1086-1090.
39. Johnson, D. C., et al., *Synthesis of copper silicide nanocrystallites embedded in silicon nanowires for enhanced transport properties.* Journal of Materials Chemistry, 2010. 20(10): p. 1993-1998.
40. Laïk, B., et al., *An electrochemical and structural investigation of silicon nanowires as negative electrode for Li-ion batteries.* Journal of Solid State Electrochemistry, 2010. 14(10): p. 1835-1839.
41. Chen, H., et al., *Silicon nanowires coated with copper layer as anode materials for lithium-ion batteries.* Journal of Power Sources, 2011. 196(16): p. 6657-6662.
42. Hu, L. B., et al., *Si nanoparticle-decorated Si nanowire networks for Li-ion battery anodes.* Chemical Communications, 2011. 47(1): p. 367-369.
43. Park, M. H., et al., *Silicon nanotube battery anodes.* Nano Letters, 2009. 9(11): p. 3844-3847.
44. Lee, W. J., et al., *Nanoscale Si coating on the pore walls of SnO2 nanotube anode for Li rechargeable batteries.* Chemical Communications, 2010. 46(4): p. 622-624.
45. Song, T., et al., *Arrays of Sealed Silicon Nanotubes As Anodes for Lithium Ion Batteries.* Nano Letters, 2010. 10(5): p. 1710-1716.
46. Si, Q., et al., *A high performance silicon/carbon composite anode with carbon nanofiber for lithium-ion batteries.* Journal of Power Sources, 2010. 195(6): p. 1720-1725.
47. Wang, L., et al., *A novel carbon-silicon composite nanofiber prepared via electrospinning as anode material for high energy-density lithium ion batteries.* Journal of Power Sources, 2010. 195(15): p. 5052-5056.
48. Wu, H., et al., *Engineering Empty Space between Si Nanoparticles for Lithium-Ion Battery Anodes.* Nano Letters, 2012. 12(2): p. 904-909.
49. Yu, D. S. and L. M. Dai, *Self-Assembled Graphene/Carbon Nanotube Hybrid Films for Supercapacitors.* Journal of Physical Chemistry Letters, 2010. 1(2): p. 467-470.
50. Yao, Y., et al., *Interconnected Silicon Hollow Nanospheres for Lithium-Ion Battery Anodes with Long Cycle Life.* Nano Letters, 2011. 11(7): p. 2949-2954.
51. Chen, D., et al., *Reversible lithium-ion storage in silver-treated nanoscale hollow porous silicon particles.* Angewandte Chemie (International ed. in English), 2012. 51(10): p. 2409-13.
52. Zhang, T., et al., *Core-shell Si/C nanocomposite as anode material for lithium ion batteries.* Pure and Applied Chemistry, 2006. 78(10): p. 1889-1896.
53. Du, C., et al., *Covalently-functionalizing synthesis of Si@C core-shell nanocomposites as high-capacity anode materials for lithium-ion batteries.* Journal of Materials Chemistry, 2011. 21(39): p. 15692-15697.
54. Hu, Y. S., et al., *Superior storage performance of a Si@SiO x/C nanocomposite as anode material for lithium-ion batteries.* Angewandte Chemie—International Edition, 2008. 47(9): p. 1645-1649.
55. Liu, B., et al., *Hierarchical silicon nanowires-carbon textiles matrix as a binder free anode for high-performance advanced lithium-ion batteries.* Scientific Reports, 2013. 3.
56. Lee, B. S., et al., *Fabrication of Si core/C shell nanofibers and their electrochemical performances as a lithium-ion battery anode.* Journal of Power Sources, 2012. 206: p. 267-273.
57. Zhao, X., et al., *support-In-Plane Vacancy-Enabled High-Power Si-Graphene Composite Electrode for Lithium-Ion Batteries.* Advance Energy Materials, 2011. 1(6).
58. Zhao, X., et al., *In-Plane Vacancy-Enabled High-Power Si-Graphene Composite Electrode for Lithium-Ion Batteries.* Advance Energy Materials, 2011. 1(6): p. 1079-1084.
59. Lee, J. K., et al., *Silicon nanoparticles-graphene paper composites for Li ion battery anodes.* Chemical Communications, 2010. 46(12): p. 2025-2027.
60. Chabot, V., et al., *A review of graphene and graphene oxide sponge: material synthesis and applications to energy and the environment.* Energy & Environmental Science, 2014. 7(5): p. 1564-1596.
61. Xu, Y. X., et al., *Flexible Solid-State Supercapacitors Based on Three-Dimensional Graphene Hydrogel Films.* ACS Nano, 2013. 7(5): p. 4042-4049.
62. Xu, Y., et al., *Functionalized graphene hydrogel-based high-performance supercapacitors.* Advanced materials, 2013. 25(40): p. 5779-84.
63. Tao, Y., et al., *Towards ultrahigh volumetric capacitance: graphene derived highly dense but porous carbons for supercapacitors.* Scientific Reports, 2013. 3.
64. Wang, R. H., et al., *Solvothermal-Induced 3D Macroscopic SnO2/Nitrogen-Doped Graphene Aerogels for High Capacity and Long-Life Lithium Storage.* ACS applied materials & interfaces, 2014. 6(5): p. 3427-3436.
65. Liu, X., et al., *3D graphene aerogel-supported SnO2 nanoparticles for efficient detection of NO2.* Rsc Advances, 2014. 4(43): p. 22601-22605.
66. Lu, S. T., et al., *Three-Dimensional Sulfur/Graphene Multifunctional Hybrid Sponges for Lithium-Sulfur Batteries with Large Areal Mass Loading.* Scientific Reports, 2014. 4.
67. Stoller, M. D., et al., *Graphene-based ultracapacitors.* Nano Lett, 2008. 8(10): p. 3498-502.
68. Wang, Y., et al., *Supercapacitor Devices Based on Graphene Materials.* Journal of Physical Chemistry C, 2009. 113(30): p. 13103-13107.
69. Wang, D. W., et al., *Fabrication of Graphene/Polyaniline Composite Paper via In Situ Anodic Electropolymerization for High Performance Flexible Electrode.* ACS Nano, 2009. 3(7): p. 1745-52.
70. Wu, Q., et al., *Supercapacitors Based on Flexible Graphene/Polyaniline Nanofiber Composite Films.* Acs Nano, 2010. 4(4): p. 1963-1970.
71. Zhang, K., et al., *Graphene/Polyaniline Nanofiber Composites as Supercapacitor Electrodes.* Chemistry of Materials, 2010. 22(4): p. 1392-1401.
72. Yu, A. P., et al., *Ultrathin, transparent, and flexible graphene films for supercapacitor application.* Applied Physics Letters, 2010. 96(25).
73. Wang, H. W., et al., *Cutting and Unzipping Multiwalled Carbon Nanotubes into Curved Graphene Nanosheets* and *Their Enhanced Supercapacitor Performance*. Acs Applied Materials & Interfaces, 2012. 4(12): p. 6826-6833.

74. Zhang, C. G., et al., *Splitting of a Vertical Multiwalled Carbon Nanotube Carpet to a Graphene Nanoribbon Carpet and Its Use in Supercapacitors*. Acs Nano, 2013. 7(6): p. 5151-5159.

75. Zhao, Y., et al., *Highly compression-tolerant supercapacitor based on polypyrrole-mediated graphene foam electrodes*. Adv Mater, 2013. 25(4): p. 591-5.

76. Tao, Y., et al., *Towards ultrahigh volumetric capacitance: graphene derived highly dense but porous carbons for supercapacitors*. Sci Rep, 2013. 3: p. 2975.

77. Luo, J., H. D. Jang, and J. Huang, *Effect of sheet morphology on the scalability of graphene-based ultracapacitors*. ACS Nano, 2013. 7(2): p. 1464-71.

78. Mao, S., et al., *A General Approach to One-Pot Fabrication of Crumpled Graphene-Based Nanohybrids for Energy Applications*. Acs Nano, 2012. 6(8): p. 7505-7513.

79. Yan, J., et al., *High-performance supercapacitor electrodes based on highly corrugated graphene sheets*. Carbon, 2012. 50(6): p. 2179-2188.

80. Choi, B. G., et al., *3D Macroporous Graphene Frameworks for Supercapacitors with High Energy and Power Densities*. Acs Nano, 2012. 6(5): p. 4020-4028.

81. Ye, S. B., J. C. Feng, and P. Y. Wu, *Deposition of Three-Dimensional Graphene Aerogel on Nickel Foam as a Binder-Free Supercapacitor Electrode*. Acs Applied Materials & Interfaces, 2013. 5(15): p. 7122-7129.

82. Miller, J. R., R. A. Outlaw, and B. C. Holloway, *Graphene electric double layer capacitor with ultra-high-power performance*. Electrochimica Acta, 2011. 56(28): p. 10443-10449.

83. Han, K., et al., *Li2S-reduced graphene oxide nanocomposites as cathode material for lithium sulfur batteries*. Journal of Power Sources, 2014. 251(0): p. 331-337.

84. Zhang, Y., Y. Huang, and J. A. Rogers, *Mechanics of stretchable batteries and supercapacitors*. Curr. Opin. Solid State Mater. Sci., 2015. 19(3): p. 190-199.

85. Rogers, J. A., T. Someya, and Y. Huang, *Materials and Mechanics for Stretchable Electronics*. Science (Washington, D.C., U. S.), 2010. 327(5973): p. 1603-1607.

86. Ge, J., et al., *Stretchable Conductors Based on Silver Nanowires: Improved Performance through a Binary Network Design*. Angew. Chem., Int. Ed., 2013. 52(6): p. 1654-1659.

87. Sekitani, T., et al., *A Rubberlike Stretchable Active Matrix Using Elastic Conductors*. Science (Washington, D.C., U. S.), 2008. 321(5895): p. 1468-1472.

88. Kim, D.-H., et al., *Flexible and stretchable electronics for biointegrated devices*. Annu. Rev. Biomed. Eng., 2012. 14: p. 113-128.

89. Zang, J., et al., *Stretchable and High Performance Supercapacitors with Crumpled Graphene Papers*. Sci. Rep., 2014. 4: p. 6492.

90. Cheng, T., et al., *Stretchable Thin-Film Electrodes for Flexible Electronics with High Deformability and Stretchability*. Adv. Mater., 2015. 27(22): p. 3349-3376.

91. Zhang, Y., et al., *In-situ synthesis of carbon nanotube/graphene composite sponge and its application as compressible supercapacitor electrode*. Electrochim. Acta, 2015. 157: p. 134-141.

92. Gao, Y., et al., *Transparent, flexible, and solid-state supercapacitors based on graphene electrodes*. APL Mater., 2013. 1(1): p. 012101/1-012101/7.

93. Samad, Y. A., et al., *Graphene Foam Developed with a Novel Two-Step Technique for Low and High Strains and Pressure-Sensing Applications*. Small, 2015. 11(20): p. 2380-2385.

94. Dimiev, A., et al., *Low-Loss, High Permittivity Composites Made from Graphene Nanoribbons*. ACS Appl. Mater. Interfaces, 2011. 3(12): p. 4657-4661.

95. Dimiev, A., et al., *Permittivity of Dielectric Composite Materials Comprising Graphene Nanoribbons. The Effect of Nanostructure*. ACS Appl. Mater. Interfaces, 2013. 5(15): p. 7567-7573.

96. Gupta, T. K., et al., *Superior nano-mechanical properties of reduced graphene oxide reinforced polyurethane composites*. RSC Adv., 2015. 5(22): p. 16921-16930.

97. Yao, H.-B., et al., *A Flexible and Highly Pressure-Sensitive Graphene Polyurethane Sponge Based on Fractured Microstructure Design*. Adv. Mater. (Weinheim, Ger.), 2013. 25(46): p. 6692-6698.

98. Chen, T., et al., *Ultra high permittivity and significantly enhanced electric field induced strain in PEDOT:PSS-RGO@PU intelligent shape-changing electro-active polymers*. RSC Adv., 2014. 4(109): p. 64061-64067.

99. Chen, T., et al., *Achieving High Performance Electric Field Induced Strain: A Rational Design of Hyperbranched Aromatic Polyamide Functionalized Graphene-Polyurethane Dielectric Elastomer Composites*. J. Phys. Chem. B, 2015. 119(12): p. 4521-4530.

100. Krol, P., et al., *Composites prepared from the waterborne polyurethane cationomers-modified graphene. Part I Synthesis, structure, and physicochemical properties*. Colloid Polym. Sci., 2015. 293(2): p. 421-431.

101. Hodlur, R. M. and M. K. Rabinal, *Self assembled graphene layers on polyurethane foam as a highly pressure sensitive conducting composite*. Compos. Sci. Technol., 2014. 90: p. 160-165.

102. Chen, D. and G. Chen, *In situ synthesis of thermoplastic polyurethane/graphene nanoplatelets conductive composite by ball milling*. J. Reinf. Plast. Compos., 2013. 32(5): p. 300-307, 8 pp.

103. Ding, J. N., et al., *Electrical conductivity of waterborne polyurethane/graphene composites prepared by solution mixing*. J. Compos. Mater., 2012. 46(6): p. 747-752.

104. Pushparaj, V. L., et al., *Flexible energy storage devices based on nanocomposite paper*. Proceedings of the National Academy of Sciences of the United States of America, 2007. 104(34): p. 13574-13577.

105. Gwon, H., et al., *Flexible energy storage devices based on graphene paper*. Energy & Environmental Science, 2011. 4(4): p. 1277-1283.

106. Bae, J., et al., *Fiber Supercapacitors Made of Nanowire-Fiber Hybrid Structures for Wearable/Flexible Energy Storage*. Angewandte Chemie-International Edition, 2011. 50(7): p. 1683-1687.

107. Cakici, M., K. R. Reddy, and F. Alonso-Marroquin, *Advanced electrochemical energy storage supercapacitors based on the flexible carbon fiber fabric-coated with uniform coral-like $MnO_2$ structured electrodes*. Chemical Engineering Journal, 2017. 309: p. 151-158.

108. Xu, L. L., et al., *Graphene/cotton composite fabrics as flexible electrode materials for electrochemical capacitors*. Rsc Advances, 2015. 5(32): p. 25244-25249.

109. Yu, Y. Y., et al., *Electromechanical properties of reduced graphene oxide thin film on 3D elastomeric substrate*. Carbon, 2017. 115: p. 380-387.

110. Zang, J., et al., *Stretchable and high-performance supercapacitors with crumpled graphene papers*. Sci Rep, 2014. 4: p. 6492.

111. L. J. Gibson, M. F. A., *Cellular Solids: Structure and Properties*. 2nd ed. 1997, New York: Cambridge University Press.
112. Maria C. Militello, S. W. G., *Manganese Dioxide (MnO2) by XPS*. Surface Science Spectra, 2001. 8.
113. Biesinger, M. C., et al., *Resolving surface chemical states in XPS analysis of first row transition metals, oxides and hydroxides: Cr, Mn, Fe, Co and Ni*. Applied Surface Science, 2011. 257(7): p. 2717-2730.
114. Park, S., et al., *Graphene oxide papers modified by divalent ions—Enhancing mechanical properties via chemical cross-linking*. Acs Nano, 2008. 2(3): p. 572-578.
115. Jiang, X., et al., *Self-Assembly of Reduced Graphene Oxide into Three-Dimensional Architecture by Divalent Ion Linkage*. Journal of Physical Chemistry C, 2010. 114(51): p. 22462-22465.
116. Chowdhury, I., et al., *Aggregation and Stability of Reduced Graphene Oxide: Complex Roles of Divalent Cations, pH, and Natural Organic Matter*. Environmental Science & Technology, 2015. 49(18): p. 10886-10893.
117. Yeh, C. N., et al., *On the origin of the stability of graphene oxide membranes in water*. Nature Chemistry, 2015. 7(2): p. 166-170.
118. Li, A. T., et al., *Incorporating multivalent metal cations into graphene oxide: Towards highly-aqueous-stable freestanding membrane via vacuum filtration with polymeric filters*. Materials Today Communications, 2017. 11: p. 139-146.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A supercapacitor comprising:
   a first electrode;
   a second electrode, wherein at least one of the first and second electrodes is a porous electrode that is reversibly deformable under a compressive force; and
   a liquid electrolyte disposed between the first electrode and the second electrode and infused into pores of the porous electrode;
   wherein the porous electrode comprises an elastomer matrix having surfaces which define the pores of the porous electrode, the elastomer matrix comprising an insulating elastomer, and an electrically conducting material coated on the surfaces of the elastomer matrix and within the pores of the porous electrode;
   wherein the reversible deformation of the porous electrode under the compressive force results in a change in an interfacial area between the porous electrode and the electrolyte, which causes a change in capacitance of the supercapacitor.

2. The supercapacitor of claim 1, wherein both of the first and second electrodes are porous electrodes that are each reversibly deformable under the compressive force and comprise the elastomer matrix having surfaces which define the pores of each porous electrode, the elastomer matrix comprising the insulating elastomer and the electrically conducting material coated on the surfaces of the elastomer matrix and within the pores of each porous electrode;
   wherein the reversible deformation of each porous electrode under the compressive force results in a change in the interfacial area between each porous electrode and the electrolyte, which causes the change in capacitance of the supercapacitor.

3. The supercapacitor of claim 1, wherein the supercapacitor is characterized by a resistance of no more than about 500Ω at 0% compressive strain.

4. The supercapacitor of claim 1, wherein the supercapacitor is characterized by a compressive modulus in the range of from 0.01 to 0.3 MPa.

5. The supercapacitor of claim 1, wherein the change in the capacitance of the supercapacitor is at least 0.5 F/in$^3$ at 70% compressive strain.

6. The supercapacitor of claim 1, wherein the supercapacitor is characterized by a resistance of no more than about 500Ω at 0% compressive strain, the supercapacitor is characterized by a compressive modulus in the range of from 0.01 to 0.3 MPa, and the change in the capacitance of the supercapacitor is at least 0.5 F/in$^3$ at 70% compressive strain.

7. The supercapacitor of claim 1, wherein the elastomer matrix is an elastomer foam comprising the insulating elastomer.

8. The supercapacitor of claim 7, wherein the insulating elastomer is selected from polyurethane, polysiloxane, and combinations thereof.

9. The supercapacitor of claim 7, wherein the insulating elastomer is polyurethane.

10. The supercapacitor of claim 1, wherein the electrically conducting material is reduced graphene oxide.

11. The supercapacitor of claim 1, wherein the average thickness of the coating of the electrically conducting material is at least about 700 nm.

12. The supercapacitor of claim 1, wherein the porous electrode further comprises hydrophobic particles distributed throughout, and embedded within, the electrically conducting material; and a hydrogel polymer distributed throughout the electrically conducting material.

13. The supercapacitor of claim 12, wherein the hydrophobic particles comprise graphite particles, transition metal oxide particles, or combinations thereof.

14. The supercapacitor of claim 12, wherein the hydrophobic particles comprise graphite particles, MnO$_2$ particles, or combinations thereof.

15. The supercapacitor of claim 12, wherein the hydrogel polymer is polyvinylpyrrolidone.

16. The supercapacitor of claim 1, wherein the elastomer matrix is an elastomer foam comprising the insulating elastomer; and the porous electrode further comprises hydrophobic particles distributed throughout, and embedded within, the electrically conducting material, and a hydrogel polymer distributed throughout the electrically conducting material.

17. The supercapacitor of claim 16, wherein the insulating elastomer is polyurethane; the electrically conducting material is reduced graphene oxide; the hydrophobic particles comprise graphite particles, $MnO_2$ particles, or combinations thereof; and the hydrogel polymer is polyvinylpyrrolidone.

18. The supercapacitor of claim 1, wherein the porous electrode is free of a conductive, noncompressible polymer.

19. A method of using the supercapacitor of claim 1, the method comprising applying the compressive force to the porous electrode that is reversibly deformable under the compressive force to provide the change in the interfacial area between the porous electrode and the electrolyte, thereby causing the change in capacitance of the supercapacitor.

20. The method of claim 19, wherein the interfacial area increases and the capacitance increases with the compressive force.

* * * * *